United States Patent
Miller

(10) Patent No.: US 10,313,769 B2
(45) Date of Patent: Jun. 4, 2019

(54) TECHNOLOGIES FOR PERFORMING PARTIALLY SYNCHRONIZED WRITES

(71) Applicant: Intel Corporation, Santa Clara, CA (US)

(72) Inventor: Steven C. Miller, Livermore, CA (US)

(73) Assignee: Intel Corporation, Santa Clara, CA (US)

( * ) Notice: Subject to any disclaimer, the term of this patent is extended or adjusted under 35 U.S.C. 154(b) by 78 days.

(21) Appl. No.: 15/396,284

(22) Filed: Dec. 30, 2016

(65) Prior Publication Data

US 2018/0024776 A1 Jan. 25, 2018

Related U.S. Application Data

(60) Provisional application No. 62/365,969, filed on Jul. 22, 2016, provisional application No. 62/376,859, (Continued)

(51) Int. Cl.
*G06F 3/06* (2006.01)
*H04Q 11/00* (2006.01)
(Continued)

(52) U.S. Cl.
CPC ...... *H04Q 11/0005* (2013.01); *B25J 15/0014* (2013.01); *B65G 1/0492* (2013.01); *G02B 6/3882* (2013.01); *G02B 6/3893* (2013.01); *G02B 6/3897* (2013.01); *G02B 6/4292* (2013.01); *G02B 6/4452* (2013.01); *G05D 23/1921* (2013.01); *G05D 23/2039* (2013.01); *G06F 1/183* (2013.01); *G06F 3/061* (2013.01); *G06F 3/064* (2013.01); *G06F 3/067* (2013.01); *G06F 3/0611* (2013.01); (Continued)

(58) Field of Classification Search
CPC ...... G06F 3/0659; G06F 3/0611; G06F 3/067; G06F 3/061; G06F 3/0613; G06F 3/0655
See application file for complete search history.

(56) References Cited

U.S. PATENT DOCUMENTS 8,316,196 B1 * 11/2012 Mullis ................. G06F 11/2082 711/162
9,311,207 B1 * 4/2016 Marshak ............. G06F 11/3048
(Continued)

OTHER PUBLICATIONS

International search report for PCT application No. PCT/US2017/038304, dated Oct. 30, 2017 (3 pages).
(Continued)

*Primary Examiner* — Michael Krofcheck
(74) *Attorney, Agent, or Firm* — Barnes & Thornburg LLP

(57) ABSTRACT

Technologies for managing partially synchronized writes include a managed node. The managed node is to issue a write request to write a data block, on behalf of a workload, to multiple data storage devices connected to a network, pause execution of the workload, receive an initial acknowledgment associated with one of the multiple data storage devices, wherein the initial acknowledgement is indicative of successful storage of the data block, and resume execution of the workload after receipt of the initial acknowledgement and before receipt of subsequent acknowledgements associated with any of the other data storage devices. Other embodiments are also described and claimed.

22 Claims, 16 Drawing Sheets

Related U.S. Application Data filed on Aug. 18, 2016, provisional application No. 62/427,268, filed on Nov. 29, 2016.

(51) Int. Cl.

| | |
|---|---|
| H03M 7/40 | (2006.01) |
| H03M 7/30 | (2006.01) |
| G06F 16/901 | (2019.01) |
| G11C 7/10 | (2006.01) |
| H05K 7/14 | (2006.01) |
| G06F 1/18 | (2006.01) |
| G06F 13/40 | (2006.01) |
| H05K 5/02 | (2006.01) |
| G08C 17/02 | (2006.01) |
| H04L 12/24 | (2006.01) |
| H04L 29/08 | (2006.01) |
| H04L 12/26 | (2006.01) |
| H04L 12/851 | (2013.01) |
| G06F 9/50 | (2006.01) |
| H04L 12/911 | (2013.01) |
| G06F 12/109 | (2016.01) |
| H04L 29/06 | (2006.01) |
| G11C 14/00 | (2006.01) |
| G11C 5/02 | (2006.01) |
| G11C 11/56 | (2006.01) |
| G02B 6/44 | (2006.01) |
| G06F 8/65 | (2018.01) |
| G06F 12/14 | (2006.01) |
| G06F 13/16 | (2006.01) |
| H04B 10/25 | (2013.01) |
| G06F 9/4401 | (2018.01) |
| G02B 6/38 | (2006.01) |
| G02B 6/42 | (2006.01) |
| B25J 15/00 | (2006.01) |
| B65G 1/04 | (2006.01) |
| H05K 7/20 | (2006.01) |
| H04L 12/931 | (2013.01) |
| H04L 12/939 | (2013.01) |
| H04W 4/02 | (2018.01) |
| H04L 12/751 | (2013.01) |
| G06F 13/42 | (2006.01) |
| H05K 1/18 | (2006.01) |
| G05D 23/19 | (2006.01) |
| G05D 23/20 | (2006.01) |
| H04L 12/927 | (2013.01) |
| H05K 1/02 | (2006.01) |
| H04L 12/781 | (2013.01) |
| H04Q 1/04 | (2006.01) |
| G06F 12/0893 | (2016.01) |
| H05K 13/04 | (2006.01) |
| G11C 5/06 | (2006.01) |
| G06F 11/14 | (2006.01) |
| G06F 11/34 | (2006.01) |
| G06F 12/0862 | (2016.01) |
| G06F 15/80 | (2006.01) |
| H04L 12/919 | (2013.01) |
| G06F 12/10 | (2016.01) |
| G06Q 10/06 | (2012.01) |
| G07C 5/00 | (2006.01) |
| H04L 12/28 | (2006.01) |
| H04L 29/12 | (2006.01) |
| H04L 9/06 | (2006.01) |
| H04L 9/14 | (2006.01) |
| H04L 9/32 | (2006.01) |
| H04L 12/933 | (2013.01) |
| H04L 12/947 | (2013.01) |
| H04L 12/811 | (2013.01) |
| G06F 17/30 | (2006.01) |
| H04W 4/80 | (2018.01) |
| G06Q 10/08 | (2012.01) |
| G06Q 10/00 | (2012.01) |
| G06Q 50/04 | (2012.01) |

(52) U.S. Cl.
 CPC .......... G06F 3/0613 (2013.01); G06F 3/0616 (2013.01); G06F 3/0619 (2013.01); G06F 3/0625 (2013.01); G06F 3/0631 (2013.01); G06F 3/0638 (2013.01); G06F 3/0647 (2013.01); G06F 3/0653 (2013.01); G06F 3/0655 (2013.01); G06F 3/0658 (2013.01); G06F 3/0659 (2013.01); G06F 3/0664 (2013.01); G06F 3/0665 (2013.01); G06F 3/0673 (2013.01); G06F 3/0679 (2013.01); G06F 3/0683 (2013.01); G06F 3/0688 (2013.01); G06F 3/0689 (2013.01); G06F 8/65 (2013.01); G06F 9/4401 (2013.01); G06F 9/505 (2013.01); G06F 9/5016 (2013.01); G06F 9/5044 (2013.01); G06F 9/5072 (2013.01); G06F 9/5077 (2013.01); G06F 11/141 (2013.01); G06F 11/3414 (2013.01); G06F 12/0862 (2013.01); G06F 12/0893 (2013.01); G06F 12/10 (2013.01); G06F 12/109 (2013.01); G06F 12/1408 (2013.01); G06F 13/161 (2013.01); G06F 13/1668 (2013.01); G06F 13/1694 (2013.01); G06F 13/409 (2013.01); G06F 13/4022 (2013.01); G06F 13/4068 (2013.01); G06F 13/42 (2013.01); G06F 13/4282 (2013.01); G06F 15/8061 (2013.01); G06F 16/9014 (2019.01); G06F 17/30949 (2013.01); G06Q 10/06 (2013.01); G06Q 10/06314 (2013.01); G07C 5/008 (2013.01); G08C 17/02 (2013.01); G11C 5/02 (2013.01); G11C 5/06 (2013.01); G11C 7/1072 (2013.01); G11C 11/56 (2013.01); G11C 14/0009 (2013.01); H03M 7/30 (2013.01); H03M 7/3084 (2013.01); H03M 7/3086 (2013.01); H03M 7/40 (2013.01); H03M 7/4031 (2013.01); H03M 7/4056 (2013.01); H03M 7/4081 (2013.01); H03M 7/6005 (2013.01); H03M 7/6023 (2013.01); H04B 10/2504 (2013.01); H04L 9/0643 (2013.01); H04L 9/14 (2013.01); H04L 9/3247 (2013.01); H04L 9/3263 (2013.01); H04L 12/2809 (2013.01); H04L 29/12009 (2013.01); H04L 41/024 (2013.01); H04L 41/046 (2013.01); H04L 41/082 (2013.01); H04L 41/0813 (2013.01); H04L 41/0896 (2013.01); H04L 41/145 (2013.01); H04L 41/147 (2013.01); H04L 43/08 (2013.01); H04L 43/0817 (2013.01); H04L 43/0876 (2013.01); H04L 43/0894 (2013.01); H04L 43/16 (2013.01); H04L 45/02 (2013.01); H04L 45/52 (2013.01); H04L 47/24 (2013.01); H04L 47/38 (2013.01); H04L 47/765 (2013.01); H04L 47/782 (2013.01); H04L 47/805 (2013.01); H04L 47/82 (2013.01); H04L 47/823 (2013.01); H04L 49/15 (2013.01); H04L 49/25 (2013.01); H04L 49/357 (2013.01); H04L 49/45 (2013.01); H04L 49/555 (2013.01); H04L 67/02 (2013.01); H04L 67/10 (2013.01); H04L

67/1004 (2013.01); *H04L 67/1008* (2013.01); *H04L 67/1012* (2013.01); *H04L 67/1014* (2013.01); *H04L 67/1029* (2013.01); *H04L 67/1034* (2013.01); *H04L 67/1097* (2013.01); *H04L 67/12* (2013.01); *H04L 67/16* (2013.01); *H04L 67/306* (2013.01); *H04L 67/34* (2013.01); *H04L 69/04* (2013.01); *H04L 69/329* (2013.01); *H04Q 1/04* (2013.01); *H04Q 11/00* (2013.01); *H04Q 11/0003* (2013.01); *H04Q 11/0062* (2013.01); *H04Q 11/0071* (2013.01); *H04W 4/023* (2013.01); *H05K 1/0203* (2013.01); *H05K 1/181* (2013.01); *H05K 5/0204* (2013.01); *H05K 7/1418* (2013.01); *H05K 7/1421* (2013.01); *H05K 7/1422* (2013.01); *H05K 7/1447* (2013.01); *H05K 7/1461* (2013.01); *H05K 7/1487* (2013.01); *H05K 7/1489* (2013.01); *H05K 7/1491* (2013.01); *H05K 7/1492* (2013.01); *H05K 7/1498* (2013.01); *H05K 7/2039* (2013.01); *H05K 7/20709* (2013.01); *H05K 7/20727* (2013.01); *H05K 7/20736* (2013.01); *H05K 7/20745* (2013.01); *H05K 7/20836* (2013.01); *H05K 13/0486* (2013.01); *G06F 2209/5019* (2013.01); *G06F 2209/5022* (2013.01); *G06F 2212/1008* (2013.01); *G06F 2212/1024* (2013.01); *G06F 2212/1041* (2013.01); *G06F 2212/1044* (2013.01); *G06F 2212/152* (2013.01); *G06F 2212/202* (2013.01); *G06F 2212/401* (2013.01); *G06F 2212/402* (2013.01); *G06F 2212/7207* (2013.01); *G06Q 10/087* (2013.01); *G06Q 10/20* (2013.01); *G06Q 50/04* (2013.01); *G08C 2200/00* (2013.01); *H04B 10/25* (2013.01); *H04L 41/12* (2013.01); *H04L 41/5019* (2013.01); *H04L 43/065* (2013.01); *H04Q 2011/0037* (2013.01); *H04Q 2011/0041* (2013.01); *H04Q 2011/0052* (2013.01); *H04Q 2011/0073* (2013.01); *H04Q 2011/0079* (2013.01); *H04Q 2011/0086* (2013.01); *H04Q 2213/13523* (2013.01); *H04Q 2213/13527* (2013.01); *H04W 4/80* (2018.02); *H05K 7/1485* (2013.01); *H05K 2201/066* (2013.01); *H05K 2201/10121* (2013.01); *H05K 2201/10159* (2013.01); *H05K 2201/10189* (2013.01); *Y02D 10/14* (2018.01); *Y02D 10/151* (2018.01); *Y02P 90/30* (2015.11); *Y10S 901/01* (2013.01)

(56) References Cited

U.S. PATENT DOCUMENTS

| | | | |
|---|---|---|---|
| 2005/0015657 A1* | 1/2005 | Sugiura | G06F 11/1482 714/6.12 |
| 2005/0243609 A1* | 11/2005 | Yang | G06F 3/0617 365/189.05 |
| 2010/0281229 A1 | 11/2010 | Iwamura et al. | |
| 2013/0042156 A1 | 2/2013 | Srinivasan et al. | |
| 2013/0238876 A1* | 9/2013 | Fiske | G06F 3/0641 711/216 |
| 2014/0229673 A1 | 8/2014 | Colgrove et al. | |
| 2016/0034210 A1 | 2/2016 | Gentile et al. | |
| 2016/0041882 A1* | 2/2016 | Kruse | G06F 11/1438 714/16 |
| 2017/0286153 A1* | 10/2017 | Bak | G06F 9/485 |

OTHER PUBLICATIONS

Written opinion for PCT application No. PCT/US2017/038304, dated Oct. 30, 2017 (4 pages).

* cited by examiner

TECHNOLOGIES FOR PERFORMING PARTIALLY SYNCHRONIZED WRITES

CROSS-REFERENCE TO RELATED APPLICATIONS

The present application claims the benefit of U.S. Provisional Patent Application No. 62/365,969, filed Jul. 22, 2016, U.S. Provisional Patent Application No. 62/376,859, filed Aug. 18, 2016, and U.S. Provisional Patent Application No. 62/427,268, filed Nov. 29, 2016.

BACKGROUND

In a data center, a compute node executing a workload may request to write a data block to data storage. To provide redundancy in the data storage, the compute node may send the data block through a network to multiple data storage devices that may be located in different locations, such that if any one of the data storage devices becomes disconnected from the network or otherwise unavailable, the compute node may rely on one of the other data storage devices to access the data. In doing so, the compute node typically pauses execution of the workload until the compute node has received a confirmation from the multiple networked data storage devices that the data has been successfully committed to non-volatile storage. At that point, the compute node determines that the data has been made "durable" (e.g., able to withstand at least one failure at one of the locations). However, while the process enhances the resiliency of the data, the time consumed in receiving the acknowledgements may adversely affect the quality of service (e.g., latency, etc.) of the workload.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

DETAILED DESCRIPTION OF THE DRAWINGS

Figure 1:
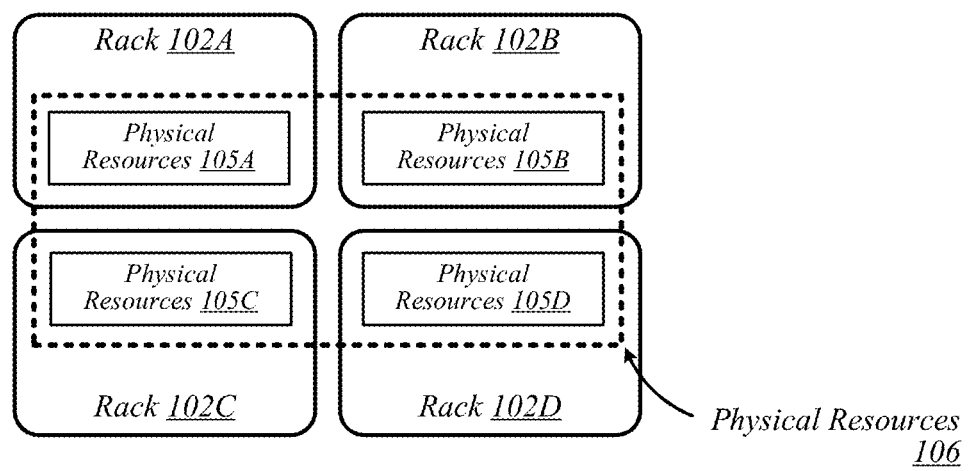
FIG. 1 is a diagram of a conceptual overview of a data center in which one or more techniques described herein may be implemented according to various embodiments.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one A, B, and C" can mean (A); (B); (C); (A and B); (A and C); (B and C); or (A, B, and C). Similarly, items listed in the form of "at least one of A, B, or C" can mean (A); (B); (C); (A and B); (A and C); (B and C); or (A, B, and C).

The disclosed embodiments may be implemented, in some cases, in hardware, firmware, software, or any combination thereof. The disclosed embodiments may also be implemented as instructions carried by or stored on a transitory or non-transitory machine-readable (e.g., computer-readable) storage medium, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

FIG. 1 illustrates a conceptual overview of a data center 100 that may generally be representative of a data center or other type of computing network in/for which one or more techniques described herein may be implemented according to various embodiments. As shown in FIG. 1, data center 100 may generally contain a plurality of racks, each of which may house computing equipment comprising a respective set of physical resources. In the particular non-limiting example depicted in FIG. 1, data center 100 contains four racks 102A to 102D, which house computing equipment comprising respective sets of physical resources 105A to 105D. According to this example, a collective set of physical resources 106 of data center 100 includes the various sets of physical resources 105A to 105D that are distributed among racks 102A to 102D. Physical resources 106 may include resources of multiple types, such as—for example—processors, co-processors, accelerators, field-programmable gate arrays (FPGAs), memory, and storage. The embodiments are not limited to these examples.

The illustrative data center 100 differs from typical data centers in many ways. For example, in the illustrative embodiment, the circuit boards ("sleds") on which components such as CPUs, memory, and other components are placed are designed for increased thermal performance In particular, in the illustrative embodiment, the sleds are shallower than typical boards. In other words, the sleds are shorter from the front to the back, where cooling fans are located. This decreases the length of the path that air must to travel across the components on the board. Further, the components on the sled are spaced further apart than in typical circuit boards, and the components are arranged to reduce or eliminate shadowing (i.e., one component in the air flow path of another component). In the illustrative embodiment, processing components such as the processors are located on a top side of a sled while near memory, such as dual in-line memory modules (DIMMs), are located on a bottom side of the sled. As a result of the enhanced airflow provided by this design, the components may operate at higher frequencies and power levels than in typical systems, thereby increasing performance. Furthermore, the sleds are configured to blindly mate with power and data communication cables in each rack 102A, 102B, 102C, 102D, enhancing their ability to be quickly removed, upgraded, reinstalled, and/or replaced. Similarly, individual components located on the sleds, such as processors, accelerators, memory, and data storage drives, are configured to be easily upgraded due to their increased spacing from each other. In the illustrative embodiment, the components additionally include hardware attestation features to prove their authenticity.

Furthermore, in the illustrative embodiment, the data center 100 utilizes a single network architecture ("fabric") that supports multiple other network architectures including Ethernet and Omni-Path. The sleds, in the illustrative embodiment, are coupled to switches via optical fibers, which provide higher bandwidth and lower latency than typical twisted pair cabling (e.g., Category 5, Category 5e, Category 6, etc.). Due to the high bandwidth, low latency interconnections and network architecture, the data center 100 may, in use, pool resources, such as memory, accelerators (e.g., graphics accelerators, FPGAs, application specific integrated circuits (ASICs), etc.), and data storage drives that are physically disaggregated, and provide them to compute resources (e.g., processors) on an as needed basis, enabling the compute resources to access the pooled resources as if they were local. The illustrative data center 100 additionally receives usage information for the various resources, predicts resource usage for different types of workloads based on past resource usage, and dynamically reallocates the resources based on this information.

The racks 102A, 102B, 102C, 102D of the data center 100 may include physical design features that facilitate the automation of a variety of types of maintenance tasks. For example, data center 100 may be implemented using racks that are designed to be robotically-accessed, and to accept and house robotically-manipulatable resource sleds. Furthermore, in the illustrative embodiment, the racks 102A, 102B, 102C, 102D include integrated power sources that receive a greater voltage than is typical for power sources. The increased voltage enables the power sources to provide additional power to the components on each sled, enabling the components to operate at higher than typical frequencies.

Figure 2:
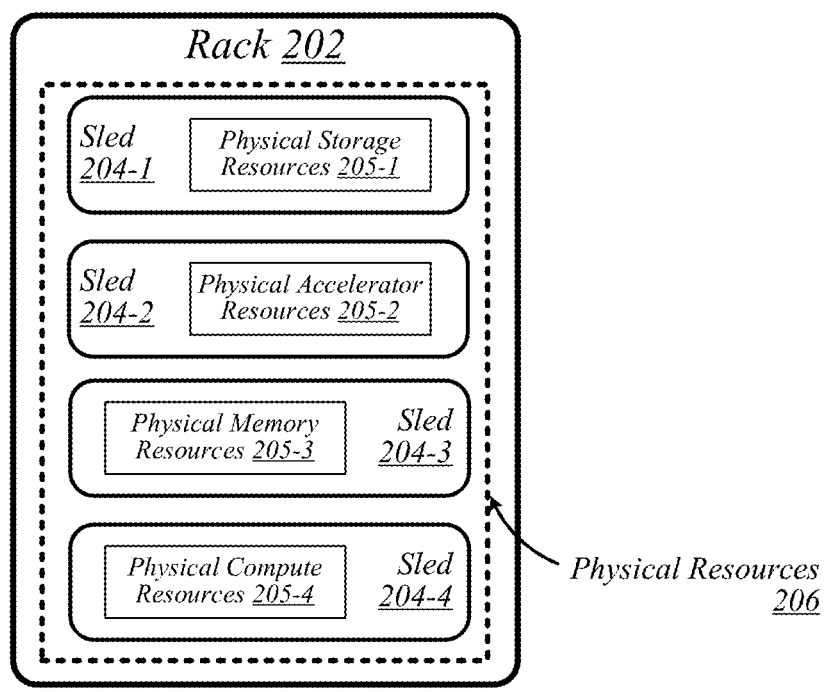
FIG. 2 is a diagram of an example embodiment of a logical configuration of a rack of the data center of FIG. 1.

FIG. 2 illustrates an exemplary logical configuration of a rack 202 of the data center 100. As shown in FIG. 2, rack 202 may generally house a plurality of sleds, each of which may comprise a respective set of physical resources. In the particular non-limiting example depicted in FIG. 2, rack 202 houses sleds 204-1 to 204-4 comprising respective sets of physical resources 205-1 to 205-4, each of which constitutes a portion of the collective set of physical resources 206 comprised in rack 202. With respect to FIG. 1, if rack 202 is representative of—for example—rack 102A, then physical resources 206 may correspond to the physical resources 105A comprised in rack 102A. In the context of this example, physical resources 105A may thus be made up of the respective sets of physical resources, including physical storage resources 205-1, physical accelerator resources 205-2, physical memory resources 205-3, and physical compute resources 205-5 comprised in the sleds 204-1 to 204-4 of rack 202. The embodiments are not limited to this example. Each sled may contain a pool of each of the various types of physical resources (e.g., compute, memory, accelerator, storage). By having robotically accessible and robotically manipulatable sleds comprising disaggregated resources, each type of resource can be upgraded independently of each other and at their own optimized refresh rate.

Figure 3:
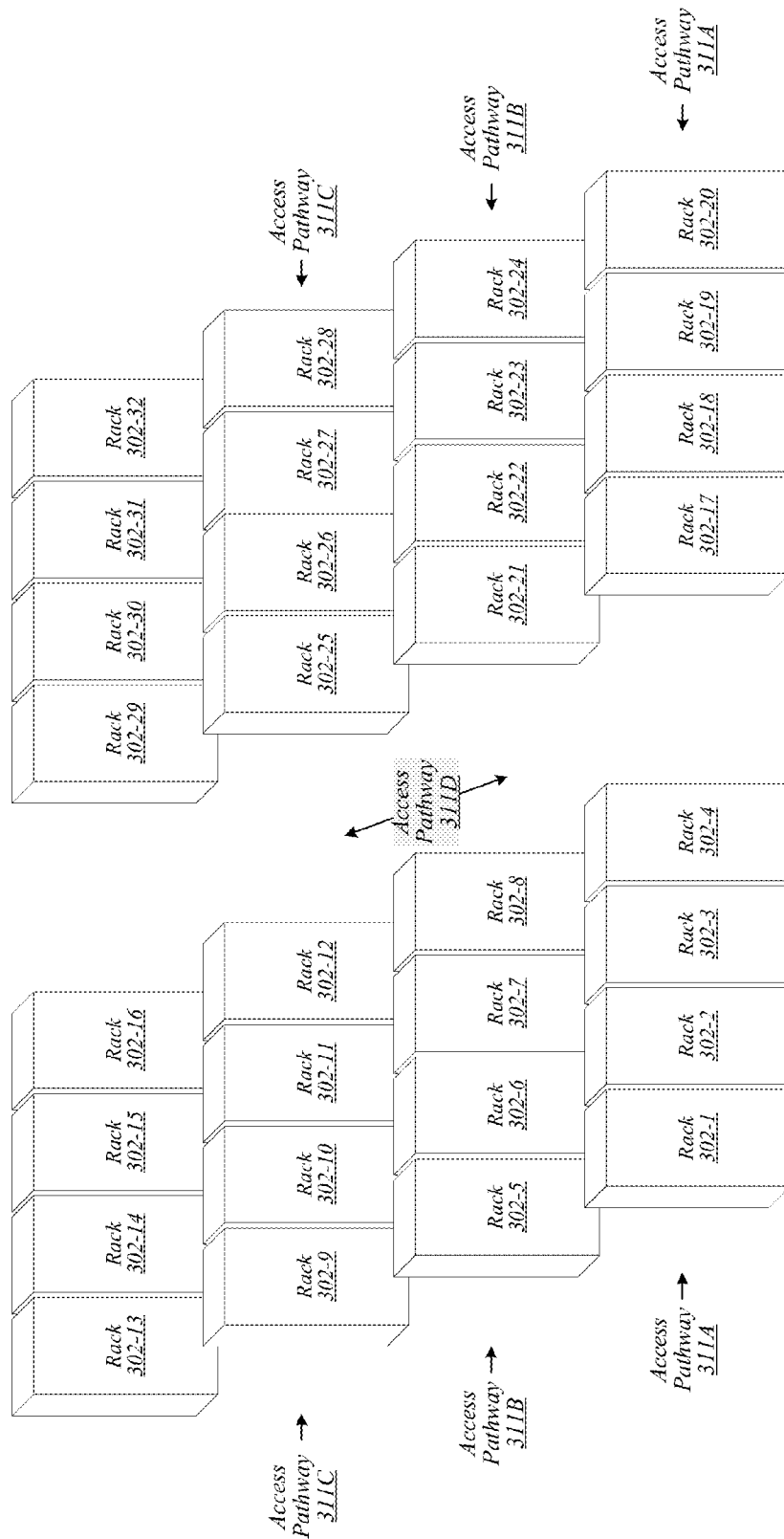
FIG. 3 is a diagram of an example embodiment of another data center in which one or more techniques described herein may be implemented according to various embodiments.

FIG. 3 illustrates an example of a data center 300 that may generally be representative of one in/for which one or more techniques described herein may be implemented according to various embodiments. In the particular non-limiting example depicted in FIG. 3, data center 300 comprises racks 302-1 to 302-32. In various embodiments, the racks of data center 300 may be arranged in such fashion as to define and/or accommodate various access pathways. For example, as shown in FIG. 3, the racks of data center 300 may be arranged in such fashion as to define and/or accommodate access pathways 311A, 311B, 311C, and 311D. In some embodiments, the presence of such access pathways may generally enable automated maintenance equipment, such as robotic maintenance equipment, to physically access the computing equipment housed in the various racks of data center 300 and perform automated maintenance tasks (e.g., replace a failed sled, upgrade a sled). In various embodiments, the dimensions of access pathways 311A, 311B, 311C, and 311D, the dimensions of racks 302-1 to 302-32, and/or one or more other aspects of the physical layout of data center 300 may be selected to facilitate such automated operations. The embodiments are not limited in this context.

Figure 4:
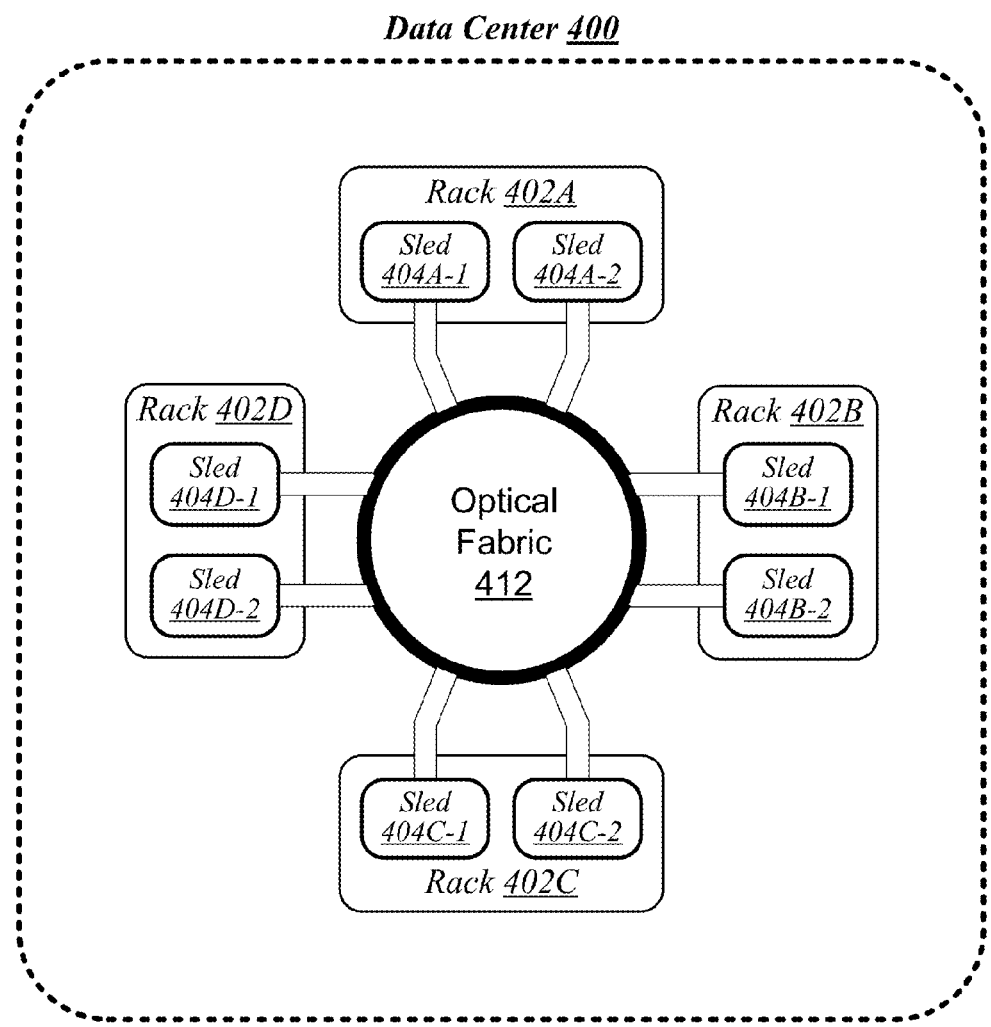
FIG. 4 is a diagram of another example embodiment of a data center in which one or more techniques described herein may be implemented according to various embodiments.

FIG. 4 illustrates an example of a data center 400 that may generally be representative of one in/for which one or more techniques described herein may be implemented according to various embodiments. As shown in FIG. 4, data center 400 may feature an optical fabric 412. Optical fabric 412 may generally comprise a combination of optical signaling media (such as optical cabling) and optical switching infrastructure via which any particular sled in data center 400 can send signals to (and receive signals from) each of the other sleds in data center 400. The signaling connectivity that optical fabric 412 provides to any given sled may include connectivity both to other sleds in a same rack and sleds in other racks. In the particular non-limiting example depicted in FIG. 4, data center 400 includes four racks 402A to 402D. Racks 402A to 402D house respective pairs of sleds 404A-1 and 404A-2, 404B-1 and 404B-2, 404C-1 and 404C-2, and 404D-1 and 404D-2. Thus, in this example, data center 400 comprises a total of eight sleds. Via optical fabric 412, each such sled may possess signaling connectivity with each of the seven other sleds in data center 400. For example, via optical fabric 412, sled 404A-1 in rack 402A may possess signaling connectivity with sled 404A-2 in rack 402A, as well as the six other sleds 404B-1, 404B-2, 404C-1, 404C-2, 404D-1, and 404D-2 that are distributed among the other racks 402B, 402C, and 402D of data center 400. The embodiments are not limited to this example.

Figure 5:
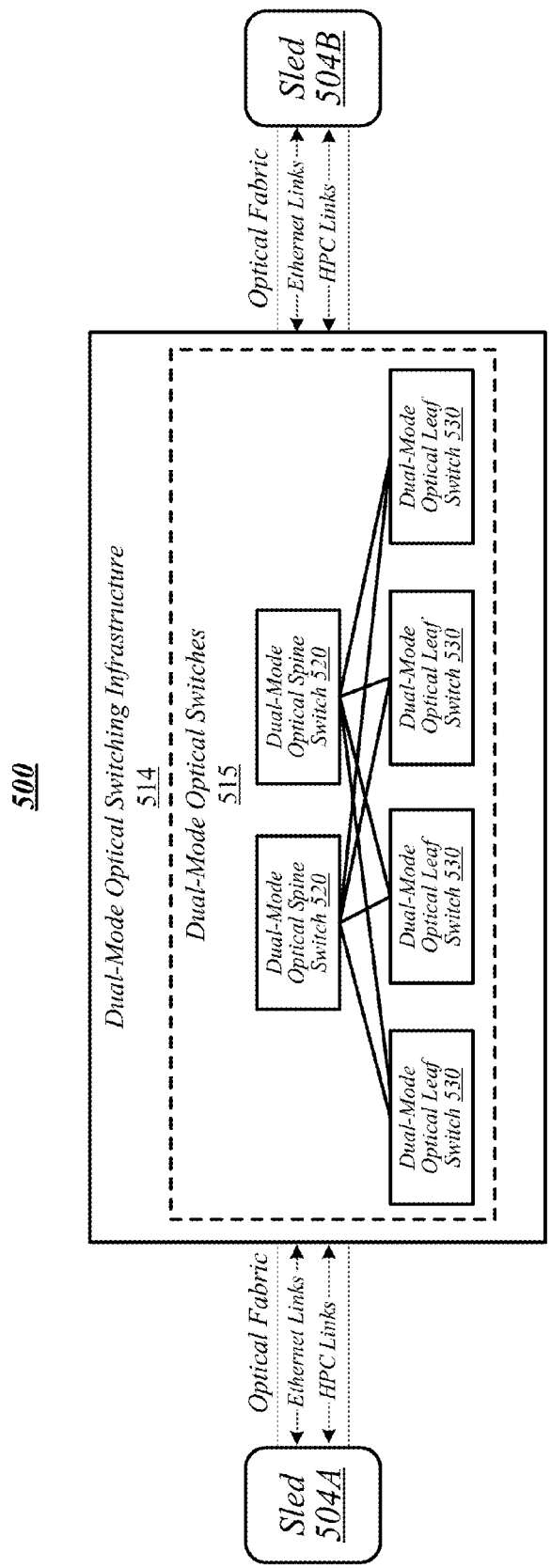
FIG. 5 is a diagram of a connectivity scheme representative of link-layer connectivity that may be established among various sleds of the data centers of FIGS. 1, 3, and 4.

FIG. 5 illustrates an overview of a connectivity scheme 500 that may generally be representative of link-layer connectivity that may be established in some embodiments among the various sleds of a data center, such as any of example data centers 100, 300, and 400 of FIGS. 1, 3, and 4. Connectivity scheme 500 may be implemented using an optical fabric that features a dual-mode optical switching infrastructure 514. Dual-mode optical switching infrastructure 514 may generally comprise a switching infrastructure that is capable of receiving communications according to multiple link-layer protocols via a same unified set of optical signaling media, and properly switching such communications. In various embodiments, dual-mode optical switching infrastructure 514 may be implemented using one or more dual-mode optical switches 515. In various embodiments, dual-mode optical switches 515 may generally comprise high-radix switches. In some embodiments, dual-mode optical switches 515 may comprise multi-ply switches, such as four-ply switches. In various embodiments, dual-mode optical switches 515 may feature integrated silicon photonics that enable them to switch communications with significantly reduced latency in comparison to conventional switching devices. In some embodiments, dual-mode optical switches 515 may constitute leaf switches 530 in a leaf-spine architecture additionally including one or more dual-mode optical spine switches 520.

In various embodiments, dual-mode optical switches may be capable of receiving both Ethernet protocol communications carrying Internet Protocol (IP packets) and communications according to a second, high-performance computing (HPC) link-layer protocol (e.g., Intel's Omni-Path Architecture's, Infiniband) via optical signaling media of an optical fabric. As reflected in FIG. 5, with respect to any particular pair of sleds 504A and 504B possessing optical signaling connectivity to the optical fabric, connectivity scheme 500 may thus provide support for link-layer connectivity via both Ethernet links and HPC links. Thus, both Ethernet and HPC communications can be supported by a single high-bandwidth, low-latency switch fabric. The embodiments are not limited to this example.

Figure 6:
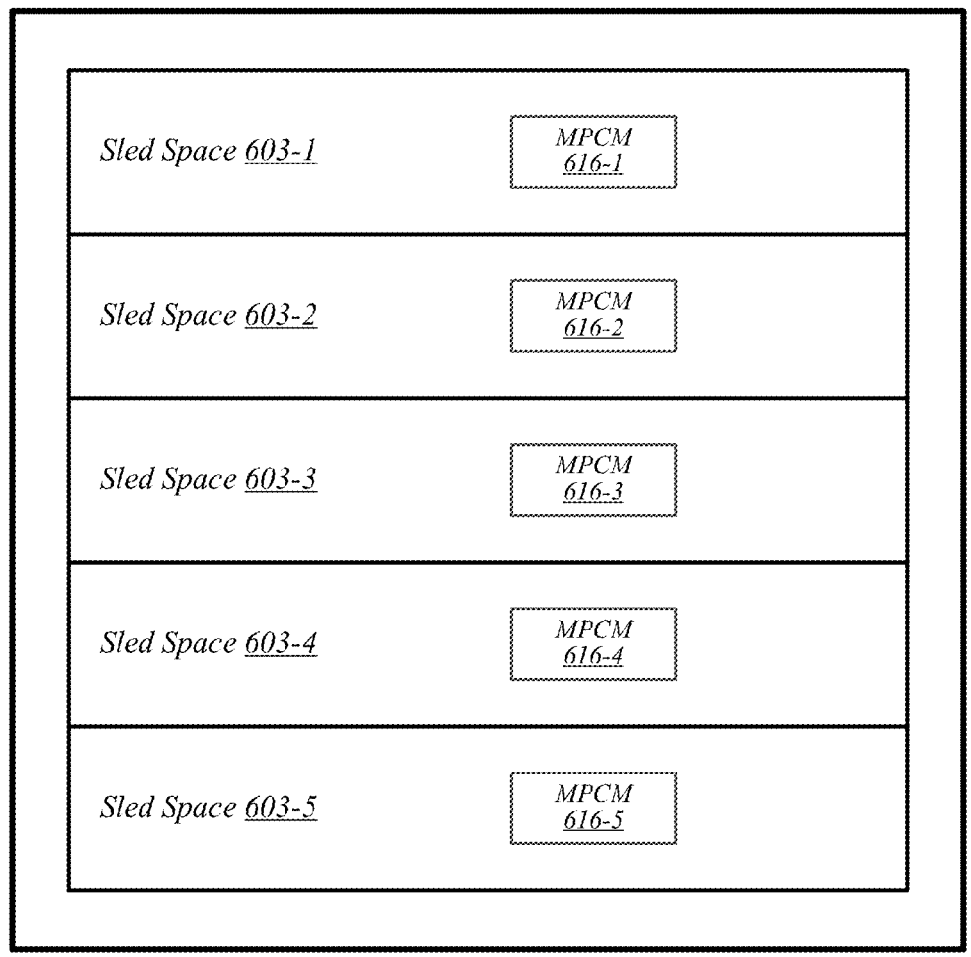
FIG. 6 is a diagram of a rack architecture that may be representative of an architecture of any particular one of the racks depicted in FIGS. 1-4 according to some embodiments.

FIG. 6 illustrates a general overview of a rack architecture 600 that may be representative of an architecture of any particular one of the racks depicted in FIGS. 1 to 4 according to some embodiments. As reflected in FIG. 6, rack architecture 600 may generally feature a plurality of sled spaces into which sleds may be inserted, each of which may be robotically-accessible via a rack access region 601. In the particular non-limiting example depicted in FIG. 6, rack architecture 600 features five sled spaces 603-1 to 603-5. Sled spaces 603-1 to 603-5 feature respective multi-purpose connector modules (MPCMs) 616-1 to 616-5.

Figure 7:
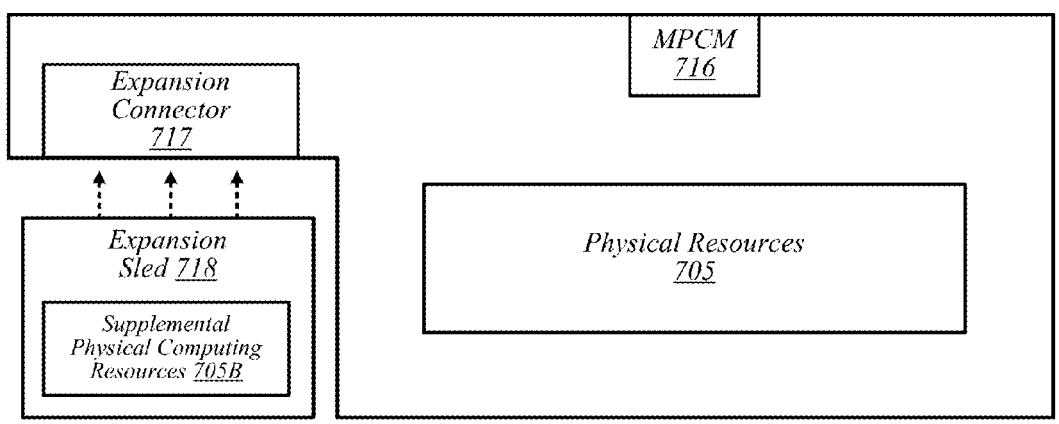
FIG. 7 is a diagram of an example embodiment of a sled that may be used with the rack architecture of FIG. 6.

FIG. 7 illustrates an example of a sled 704 that may be representative of a sled of such a type. As shown in FIG. 7, sled 704 may comprise a set of physical resources 705, as well as an MPCM 716 designed to couple with a counterpart MPCM when sled 704 is inserted into a sled space such as any of sled spaces 603-1 to 603-5 of FIG. 6. Sled 704 may also feature an expansion connector 717. Expansion connector 717 may generally comprise a socket, slot, or other type of connection element that is capable of accepting one or more types of expansion modules, such as an expansion sled 718. By coupling with a counterpart connector on expansion sled 718, expansion connector 717 may provide physical resources 705 with access to supplemental computing resources 705B residing on expansion sled 718. The embodiments are not limited in this context.

Figure 8:
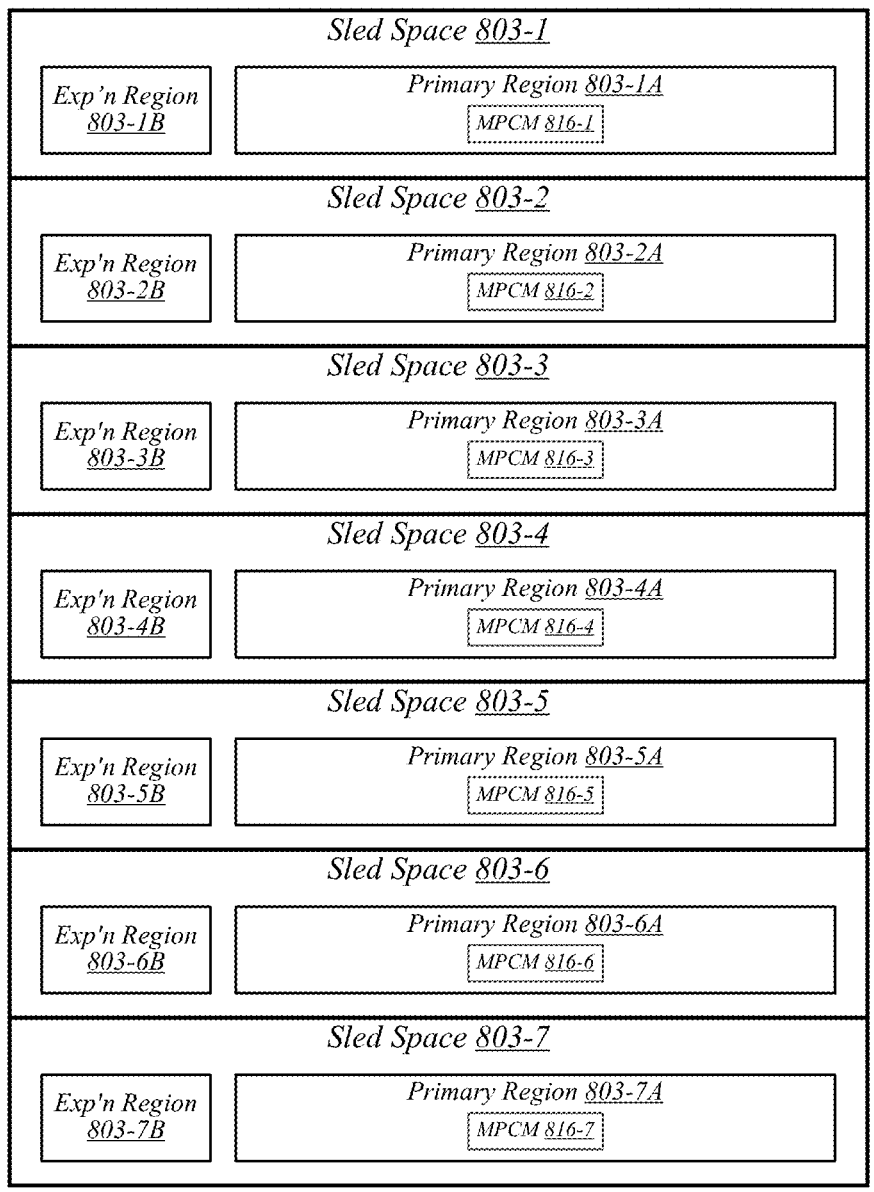
FIG. 8 is a diagram of an example embodiment of a rack architecture to provide support for sleds featuring expansion capabilities.

FIG. 8 illustrates an example of a rack architecture 800 that may be representative of a rack architecture that may be implemented in order to provide support for sleds featuring expansion capabilities, such as sled 704 of FIG. 7. In the particular non-limiting example depicted in FIG. 8, rack architecture 800 includes seven sled spaces 803-1 to 803-7, which feature respective MPCMs 816-1 to 816-7. Sled spaces 803-1 to 803-7 include respective primary regions 803-1A to 803-7A and respective expansion regions 803-1B to 803-7B. With respect to each such sled space, when the corresponding MPCM is coupled with a counterpart MPCM of an inserted sled, the primary region may generally constitute a region of the sled space that physically accommodates the inserted sled. The expansion region may generally constitute a region of the sled space that can physically accommodate an expansion module, such as expansion sled 718 of FIG. 7, in the event that the inserted sled is configured with such a module.

Figure 9:
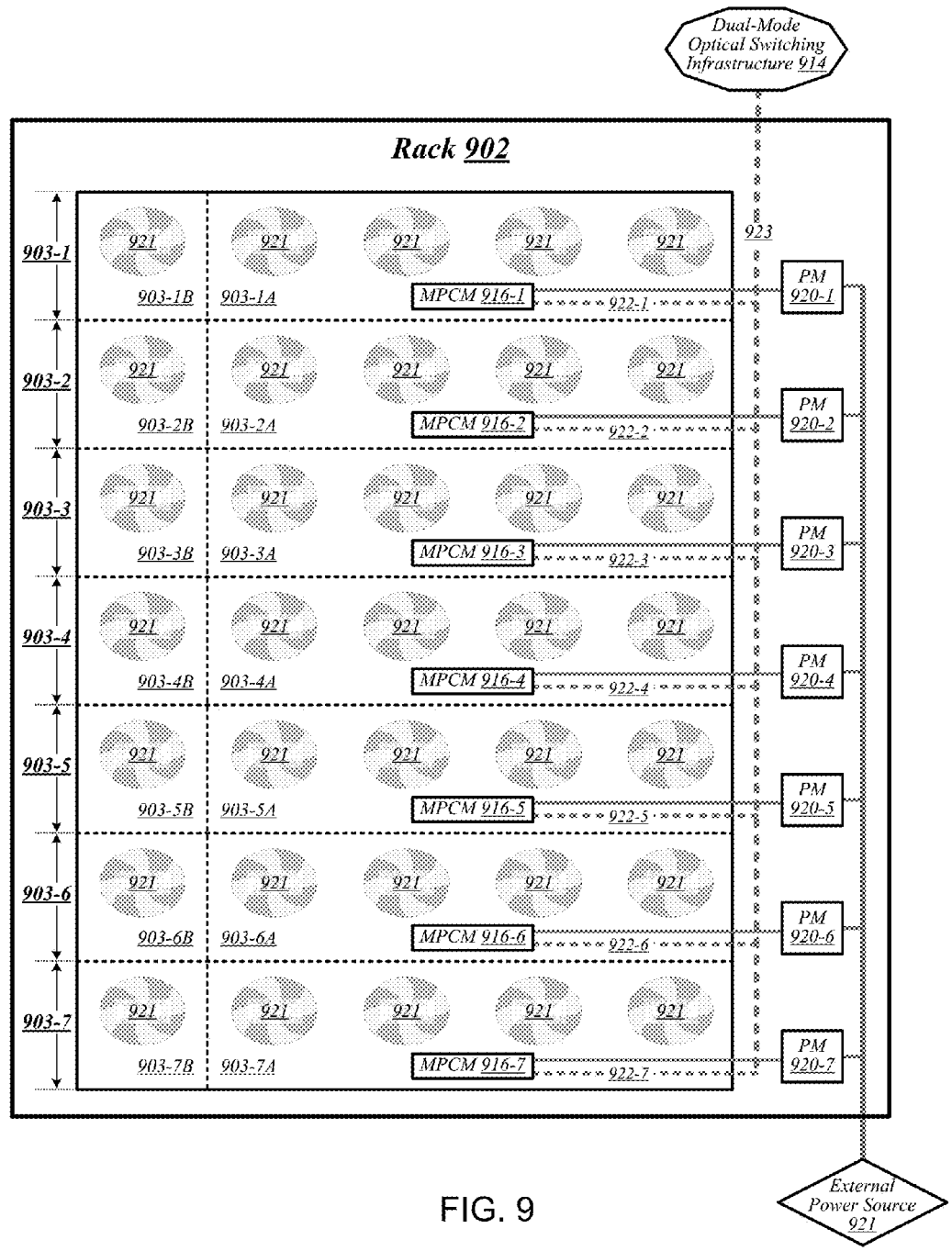
FIG. 9 is a diagram of an example embodiment of a rack implemented according to the rack architecture of FIG. 8.

FIG. 9 illustrates an example of a rack 902 that may be representative of a rack implemented according to rack architecture 800 of FIG. 8 according to some embodiments. In the particular non-limiting example depicted in FIG. 9, rack 902 features seven sled spaces 903-1 to 903-7, which include respective primary regions 903-1A to 903-7A and respective expansion regions 903-1B to 903-7B. In various embodiments, temperature control in rack 902 may be implemented using an air cooling system. For example, as reflected in FIG. 9, rack 902 may feature a plurality of fans 919 that are generally arranged to provide air cooling within the various sled spaces 903-1 to 903-7. In some embodiments, the height of the sled space is greater than the conventional "1U" server height. In such embodiments, fans 919 may generally comprise relatively slow, large diameter cooling fans as compared to fans used in conventional rack configurations. Running larger diameter cooling fans at lower speeds may increase fan lifetime relative to smaller diameter cooling fans running at higher speeds while still providing the same amount of cooling. The sleds are physically shallower than conventional rack dimensions. Further, components are arranged on each sled to reduce thermal shadowing (i.e., not arranged serially in the direction of air flow). As a result, the wider, shallower sleds allow for an increase in device performance because the devices can be operated at a higher thermal envelope (e.g., 250 W) due to improved cooling (i.e., no thermal shadowing, more space between devices, more room for larger heat sinks, etc.).

MPCMs 916-1 to 916-7 may be configured to provide inserted sleds with access to power sourced by respective power modules 920-1 to 920-7, each of which may draw power from an external power source 921. In various embodiments, external power source 921 may deliver alternating current (AC) power to rack 902, and power modules 920-1 to 920-7 may be configured to convert such AC power to direct current (DC) power to be sourced to inserted sleds. In some embodiments, for example, power modules 920-1 to 920-7 may be configured to convert 277-volt AC power into 12-volt DC power for provision to inserted sleds via respective MPCMs 916-1 to 916-7. The embodiments are not limited to this example.

MPCMs 916-1 to 916-7 may also be arranged to provide inserted sleds with optical signaling connectivity to a dual-mode optical switching infrastructure 914, which may be the same as—or similar to—dual-mode optical switching infrastructure 514 of FIG. 5. In various embodiments, optical connectors contained in MPCMs 916-1 to 916-7 may be designed to couple with counterpart optical connectors contained in MPCMs of inserted sleds to provide such sleds with optical signaling connectivity to dual-mode optical switching infrastructure 914 via respective lengths of optical cabling 922-1 to 922-7. In some embodiments, each such length of optical cabling may extend from its corresponding MPCM to an optical interconnect loom 923 that is external to the sled spaces of rack 902. In various embodiments, optical interconnect loom 923 may be arranged to pass through a support post or other type of load-bearing element of rack 902. The embodiments are not limited in this context. Because inserted sleds connect to an optical switching infrastructure via MPCMs, the resources typically spent in manually configuring the rack cabling to accommodate a newly inserted sled can be saved.

Figure 10:
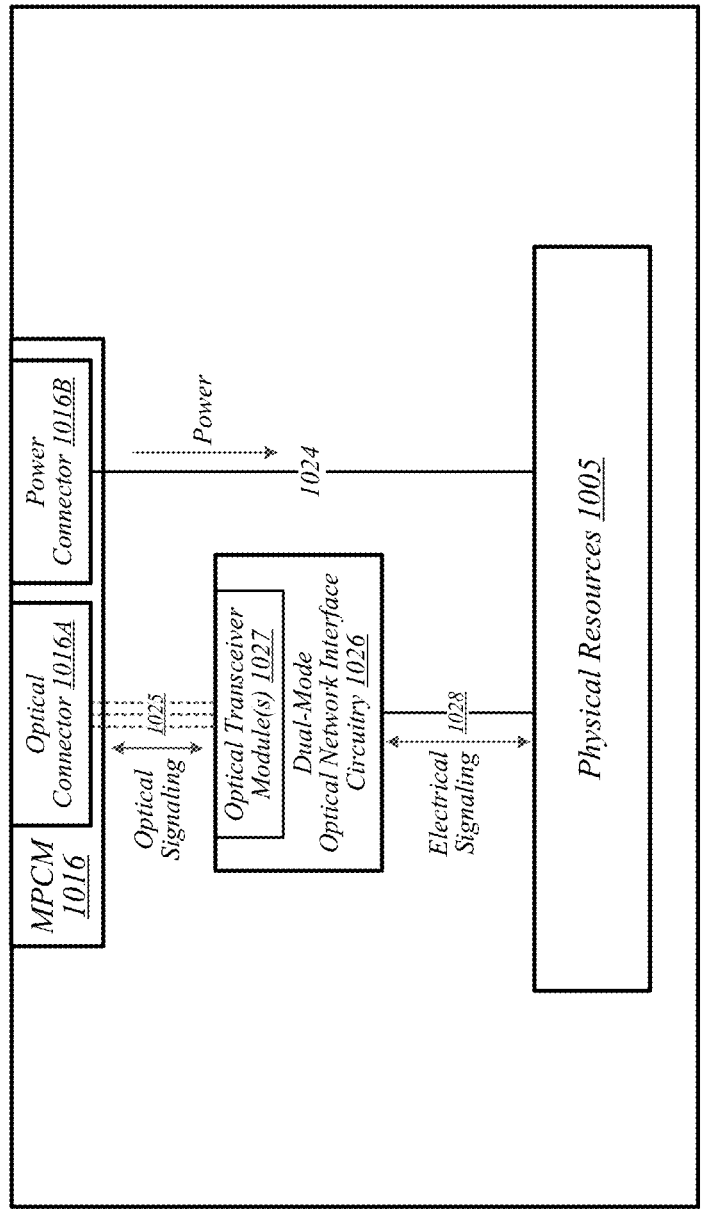
FIG. 10 is a diagram of an example embodiment of a sled designed for use in conjunction with the rack of FIG. 9.

FIG. 10 illustrates an example of a sled 1004 that may be representative of a sled designed for use in conjunction with rack 902 of FIG. 9 according to some embodiments. Sled 1004 may feature an MPCM 1016 that comprises an optical connector 1016A and a power connector 1016B, and that is designed to couple with a counterpart MPCM of a sled space in conjunction with insertion of MPCM 1016 into that sled space. Coupling MPCM 1016 with such a counterpart MPCM may cause power connector 1016 to couple with a power connector comprised in the counterpart MPCM. This may generally enable physical resources 1005 of sled 1004 to source power from an external source, via power connector 1016 and power transmission media 1024 that conductively couples power connector 1016 to physical resources 1005.

Sled 1004 may also include dual-mode optical network interface circuitry 1026. Dual-mode optical network interface circuitry 1026 may generally comprise circuitry that is capable of communicating over optical signaling media according to each of multiple link-layer protocols supported by dual-mode optical switching infrastructure 914 of FIG. 9. In some embodiments, dual-mode optical network interface circuitry 1026 may be capable both of Ethernet protocol communications and of communications according to a second, high-performance protocol. In various embodiments, dual-mode optical network interface circuitry 1026 may include one or more optical transceiver modules 1027, each of which may be capable of transmitting and receiving optical signals over each of one or more optical channels. The embodiments are not limited in this context.

Coupling MPCM 1016 with a counterpart MPCM of a sled space in a given rack may cause optical connector 1016A to couple with an optical connector comprised in the counterpart MPCM. This may generally establish optical connectivity between optical cabling of the sled and dual-mode optical network interface circuitry 1026, via each of a set of optical channels 1025. Dual-mode optical network interface circuitry 1026 may communicate with the physical resources 1005 of sled 1004 via electrical signaling media 1028. In addition to the dimensions of the sleds and arrangement of components on the sleds to provide improved cooling and enable operation at a relatively higher thermal envelope (e.g., 250 W), as described above with reference to FIG. 9, in some embodiments, a sled may include one or more additional features to facilitate air cooling, such as a heat pipe and/or heat sinks arranged to dissipate heat generated by physical resources 1005. It is worthy of note that although the example sled 1004 depicted in FIG. 10 does not feature an expansion connector, any given sled that features the design elements of sled 1004 may also feature an expansion connector according to some embodiments. The embodiments are not limited in this context.

Figure 11:
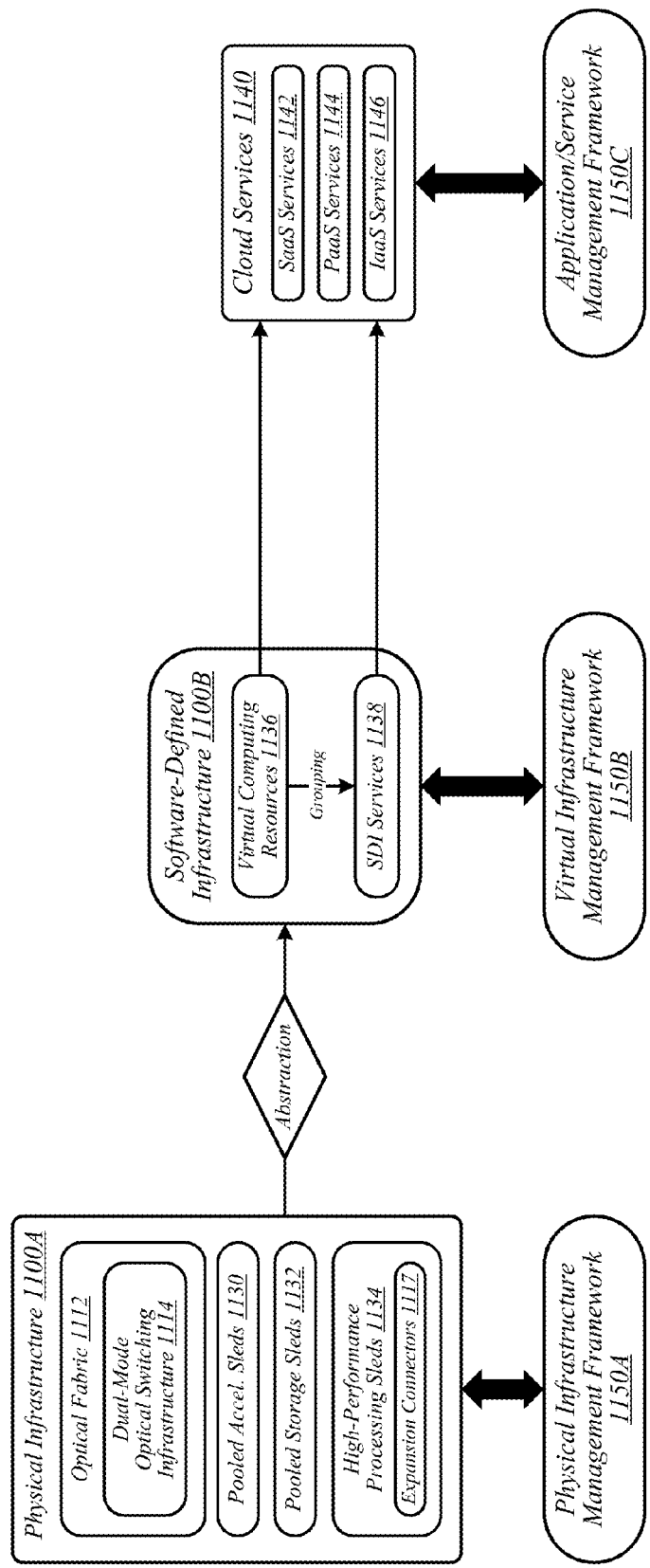
FIG. 11 is a diagram of an example embodiment of a data center in which one or more techniques described herein may be implemented according to various embodiments.

FIG. 11 illustrates an example of a data center 1100 that may generally be representative of one in/for which one or more techniques described herein may be implemented according to various embodiments. As reflected in FIG. 11, a physical infrastructure management framework 1150A may be implemented to facilitate management of a physical infrastructure 1100A of data center 1100. In various embodiments, one function of physical infrastructure management framework 1150A may be to manage automated maintenance functions within data center 1100, such as the use of robotic maintenance equipment to service computing equipment within physical infrastructure 1100A. In some embodiments, physical infrastructure 1100A may feature an advanced telemetry system that performs telemetry reporting that is sufficiently robust to support remote automated management of physical infrastructure 1100A. In various embodiments, telemetry information provided by such an advanced telemetry system may support features such as failure prediction/prevention capabilities and capacity planning capabilities. In some embodiments, physical infrastructure management framework 1150A may also be configured to manage authentication of physical infrastructure components using hardware attestation techniques. For example, robots may verify the authenticity of components before installation by analyzing information collected from a radio frequency identification (RFID) tag associated with each component to be installed. The embodiments are not limited in this context.

As shown in FIG. 11, the physical infrastructure 1100A of data center 1100 may comprise an optical fabric 1112, which may include a dual-mode optical switching infrastructure 1114. Optical fabric 1112 and dual-mode optical switching infrastructure 1114 may be the same as—or similar to— optical fabric 412 of FIG. 4 and dual-mode optical switching infrastructure 514 of FIG. 5, respectively, and may provide high-bandwidth, low-latency, multi-protocol connectivity among sleds of data center 1100. As discussed above, with reference to FIG. 1, in various embodiments, the availability of such connectivity may make it feasible to disaggregate and dynamically pool resources such as accelerators, memory, and storage. In some embodiments, for example, one or more pooled accelerator sleds 1130 may be included among the physical infrastructure 1100A of data center 1100, each of which may comprise a pool of accelerator resources—such as co-processors and/or FPGAs, for example—that is globally accessible to other sleds via optical fabric 1112 and dual-mode optical switching infrastructure 1114.

In another example, in various embodiments, one or more pooled storage sleds 1132 may be included among the physical infrastructure 1100A of data center 1100, each of which may comprise a pool of storage resources that is available globally accessible to other sleds via optical fabric 1112 and dual-mode optical switching infrastructure 1114. In some embodiments, such pooled storage sleds 1132 may comprise pools of solid-state storage devices such as solid-state drives (SSDs). In various embodiments, one or more high-performance processing sleds 1134 may be included among the physical infrastructure 1100A of data center 1100. In some embodiments, high-performance processing sleds 1134 may comprise pools of high-performance processors, as well as cooling features that enhance air cooling to yield a higher thermal envelope of up to 250 W or more. In various embodiments, any given high-performance processing sled 1134 may feature an expansion connector 1117 that can accept a far memory expansion sled, such that the far memory that is locally available to that high-performance processing sled 1134 is disaggregated from the processors and near memory comprised on that sled. In some embodiments, such a high-performance processing sled 1134 may be configured with far memory using an expansion sled that comprises low-latency SSD storage. The optical infrastructure allows for compute resources on one sled to utilize remote accelerator/FPGA, memory, and/or SSD resources that are disaggregated on a sled located on the same rack or any other rack in the data center. The remote resources can be located one switch jump away or two-switch jumps away in the spine-leaf network architecture described above with reference to FIG. 5. The embodiments are not limited in this context.

In various embodiments, one or more layers of abstraction may be applied to the physical resources of physical infrastructure 1100A in order to define a virtual infrastructure, such as a software-defined infrastructure 1100B. In some embodiments, virtual computing resources 1136 of software-defined infrastructure 1100B may be allocated to support the provision of cloud services 1140. In various embodiments, particular sets of virtual computing resources 1136 may be grouped for provision to cloud services 1140 in the form of SDI services 1138. Examples of cloud services 1140 may include—without limitation—software as a service (SaaS) services 1142, platform as a service (PaaS) services 1144, and infrastructure as a service (IaaS) services 1146.

In some embodiments, management of software-defined infrastructure 1100B may be conducted using a virtual infrastructure management framework 1150B. In various embodiments, virtual infrastructure management framework 1150B may be designed to implement workload fingerprinting techniques and/or machine-learning techniques in conjunction with managing allocation of virtual computing resources 1136 and/or SDI services 1138 to cloud services 1140. In some embodiments, virtual infrastructure management framework 1150B may use/consult telemetry data in conjunction with performing such resource allocation. In various embodiments, an application/service management framework 1150C may be implemented in order to provide quality of service (QoS) management capabilities for cloud services 1140. The embodiments are not limited in this context.

Figure 12:
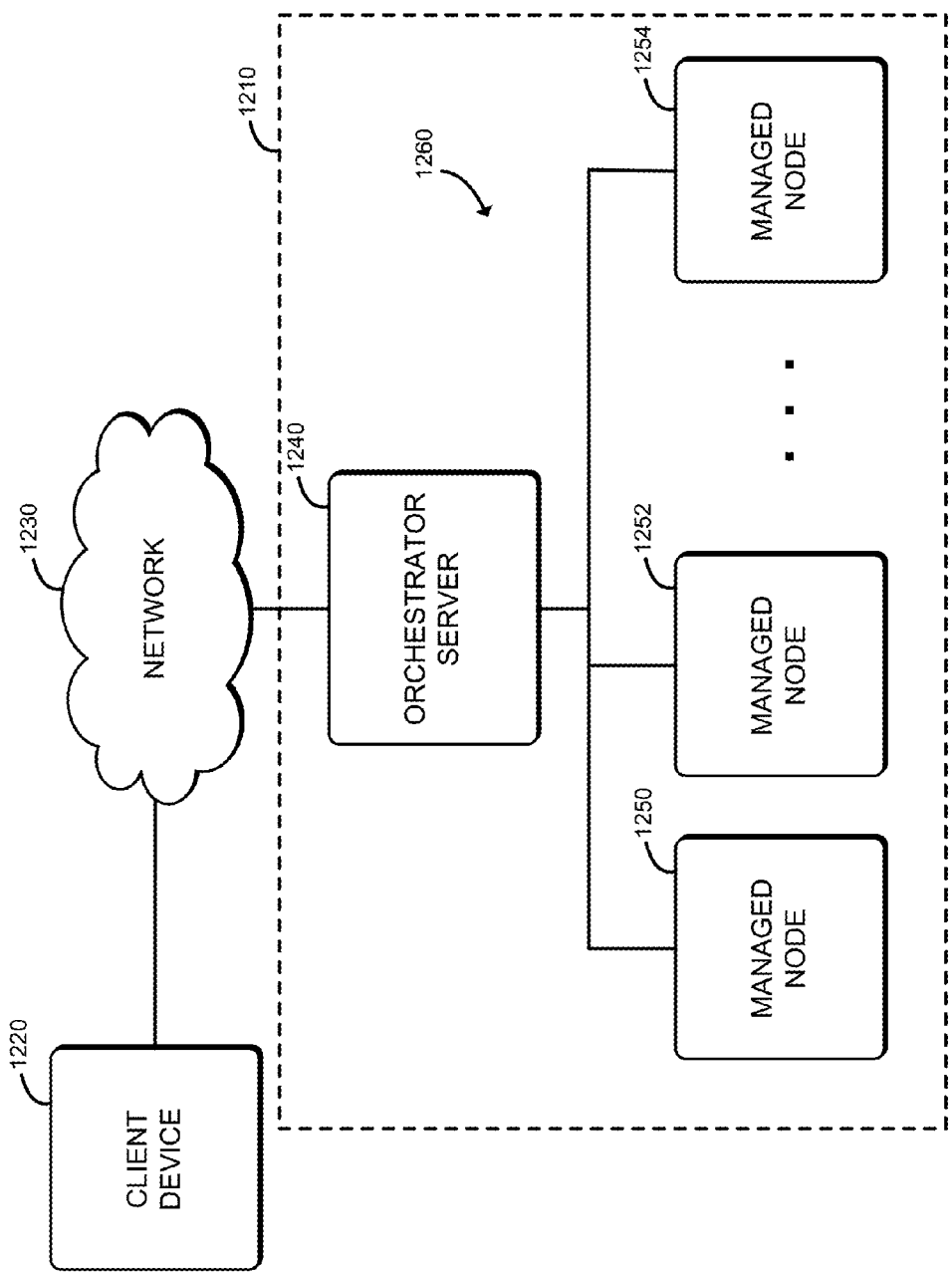
FIG. 12 is a simplified block diagram of at least one embodiment of a system for performing partially synchronized writes among a set of managed nodes.

As shown in FIG. 12, an illustrative system 1210 for performing partially synchronized writes, also referred to herein as semi-sync durable writes, to non-volatile memory (e.g., to multiple data storage devices in different failure domains) among a set of managed nodes 1260 includes an orchestrator server 1240 in communication with the set of managed nodes 1260. Each managed node 1260 may be embodied as an assembly of resources (e.g., physical resources 206), such as compute resources (e.g., physical compute resources 205-4), storage resources (e.g., physical storage resources 205-1), accelerator resources (e.g., physical accelerator resources 205-2), or other resources (e.g., physical memory resources 205-3) from the same or different sleds (e.g., the sleds 204-1, 204-2, 204-3, 204-4, etc.) or racks (e.g., one or more of racks 302-1 through 302-32). Each managed node 1260 may be established, defined, or "spun up" by the orchestrator server 1240 at the time a workload is to be assigned to the managed node 1260 or at any other time, and may exist regardless of whether any workloads are presently assigned to the managed node 1260. The system 1210 may be implemented in accordance with the data centers 100, 300, 400, 1100 described above with reference to FIGS. 1, 3, 4, and 11. In the illustrative embodiment, the set of managed nodes 1260 includes managed nodes 1250, 1252, and 1254. While three managed nodes 1260 are shown in the set, it should be understood that in other embodiments, the set may include a different number of managed nodes 1260 (e.g., tens of thousands). The system 1210 may be located in a data center and provide storage and compute services (e.g., cloud services) to a client device 1220 that is in communication with the system 1210 through a network 1230. The orchestrator server 1240 may support a cloud operating environment, such as OpenStack, and assign workloads to the managed nodes 1260 for execution.

The managed nodes 1260 may execute the workloads, such as in virtual machines or containers, on behalf of a user of the client device 1220. Managed nodes 1260 executing respective workloads may issue separate requests to write data, referred to herein as data blocks, and/or to read data blocks. To make storage of the data blocks "durable", a managed node 1260 may issue requests to multiple data storage devices (e.g., of the present managed node 1260 and/or of other managed nodes 1260) to store the same data block. By being connected with its own corresponding network interface controller, each data storage device is, in the illustrative embodiment, in a different failure domain, such that an incident that causes a network disconnection or other unavailability of a data storage device in one of the failure domains will not affect the availability of a data storage device in another of the failure domains. The various network interface controllers associated with the data storage devices in the different failure domains each includes a power loss protected buffer, and the received data block is initially written to the power loss protected buffer before it is subsequently written to the corresponding data storage device. After the data block is written to the power loss protected buffer, and before the data block has been stored in the data storage device, the corresponding network interface controller issues an acknowledgement message, indicating successful storage of the data block, through the network 1230 to the network interface controller of the sled on which the compute resources executing the workload are located. Rather than waiting to receive multiple acknowledgement messages (e.g., associated with the various data storage devices), the managed node 1260 executing the workload may resume execution of the workload after receiving only one acknowledgement message. As such, the workload continues operations while further acknowledgement messages are received and the data blocks are written from the power loss protected buffers of the network interface controllers to the corresponding data storage devices. By reducing the amount of time spent waiting for acknowledgments to write requests, the managed node 1260 may improve the quality of service of the workload.

Figure 13:
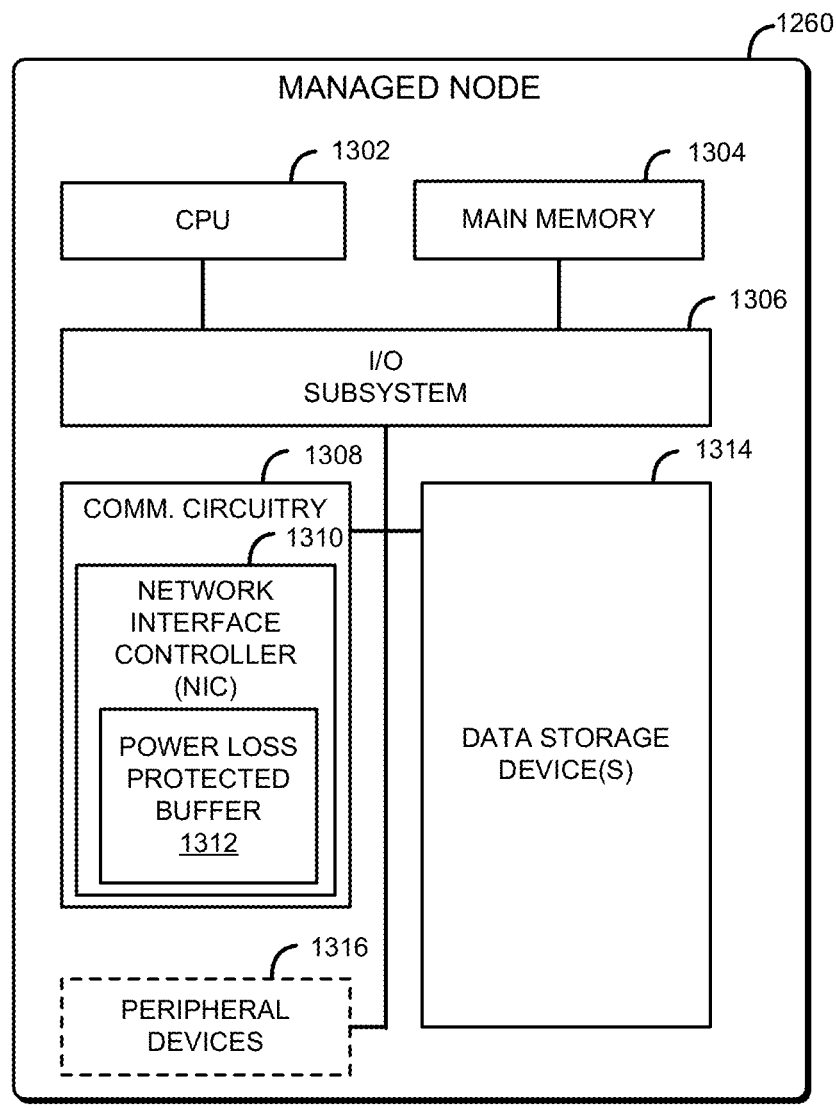
FIG. 13 is a simplified block diagram of at least one embodiment of a managed node of the system of FIG. 12.

Referring now to FIG. 13, the managed node 1260 may be embodied as any type of compute device capable of performing the functions described herein, including executing a workload, writing data blocks, and reading data blocks. For example, the managed node 1260 may be embodied as a computer, a distributed computing system, one or more sleds (e.g., the sleds 204-1, 204-2, 204-3, 204-4, etc.), a server (e.g., stand-alone, rack-mounted, blade, etc.), a multiprocessor system, a network appliance (e.g., physical or virtual), a desktop computer, a workstation, a laptop computer, a notebook computer, a processor-based system, or a network appliance. As shown in FIG. 13, the illustrative managed node 1260 includes a central processing unit (CPU) 1302, a main memory 1304, an input/output (I/O) subsystem 1306, communication circuitry 1308, and one or more data storage devices 1314. Of course, in other embodiments, the managed node 1260 may include other or additional components, such as those commonly found in a computer (e.g., display, peripheral devices, etc.). Additionally, in some embodiments, one or more of the illustrative components may be incorporated in, or otherwise form a portion of, another component. For example, in some embodiments, the main memory 1304, or portions thereof, may be incorporated in the CPU 1302.

The CPU 1302 may be embodied as any type of processor capable of performing the functions described herein. The CPU 1302 may be embodied as a single or multi-core processor(s), a microcontroller, or other processor or processing/controlling circuit. In some embodiments, the CPU 1302 may be embodied as, include, or be coupled to a field programmable gate array (FPGA), an application specific integrated circuit (ASIC), reconfigurable hardware or hardware circuitry, or other specialized hardware to facilitate performance of the functions described herein. As discussed above, the managed node 1260 may include resources distributed across multiple sleds and in such embodiments, the CPU 1302 may include portions thereof located on the same sled or different sled. Similarly, the main memory 1304 may be embodied as any type of volatile (e.g., dynamic random access memory (DRAM), etc.) or non-volatile memory or data storage capable of performing the functions described herein. In some embodiments, all or a portion of the main memory 1304 may be integrated into the CPU 1302. In operation, the main memory 1304 may store various software and data used during operation, such as data blocks, synchronization management data indicative of the number and status of partially synchronized writes at any given time, a map of locations of data blocks among different data storage devices 1314 of the managed node 1260 and/or other managed nodes 1260, operating systems, applications, programs, libraries, and drivers. As discussed above, the managed node 1260 may include resources distributed across multiple sleds and in such embodiments, the main memory 1304 may include portions thereof located on the same sled or different sled.

The I/O subsystem 1306 may be embodied as circuitry and/or components to facilitate input/output operations with the CPU 1302, the main memory 1304, and other components of the managed node 1260. For example, the I/O subsystem 1306 may be embodied as, or otherwise include, memory controller hubs, input/output control hubs, integrated sensor hubs, firmware devices, communication links (e.g., point-to-point links, bus links, wires, cables, light guides, printed circuit board traces, etc.), and/or other components and subsystems to facilitate the input/output operations. In some embodiments, the I/O subsystem 1306 may form a portion of a system-on-a-chip (SoC) and be incorporated, along with one or more of the CPU 1302, the main memory 1304, and other components of the managed node 1260, on a single integrated circuit chip.

The communication circuitry 1308 may be embodied as any communication circuit, device, or collection thereof, capable of enabling communications over the network 1230 between the managed node 1260 and another compute device (e.g., the orchestrator server 1240 and/or one or more other managed nodes 1260). The communication circuitry 1308 may be configured to use any one or more communication technology (e.g., wired or wireless communications) and associated protocols (e.g., Ethernet, Bluetooth®, Wi-Fi®, WiMAX, etc.) to effect such communication.

The illustrative communication circuitry 1308 includes a network interface controller (NIC) 1310, which may also be referred to as a host fabric interface (HFI). The NIC 1310 may be embodied as one or more add-in-boards, daughtercards, network interface cards, controller chips, chipsets, or other devices that may be used by the managed node 1260 to connect with another compute device (e.g., the orchestrator server 1240 and/or physical resources of one or more managed nodes 1260). In some embodiments, the NIC 1310 may be embodied as part of a system-on-a-chip (SoC) that includes one or more processors, or included on a multichip package that also contains one or more processors. In some embodiments, the NIC 1310 may include a processor (not shown) local to the NIC 1310. In such embodiments, the local processor of the NIC 1310 may be capable of performing one or more of the functions of the CPU 1302 described herein. Additionally, the NIC 1310 includes a power loss protected buffer 1312 which may be embodied as any volatile local memory device that, when a power loss imminent condition is detected, may write any data present in the power loss protected buffer to non-volatile memory (e.g., to one or more of the data storage devices 1314). The power loss protected buffer 1312 may include an independent power supply in some embodiments, such as capacitors or batteries that allow the power loss protected buffer 1312 to operate for a period of time even after power to the managed node 1260 has been interrupted. As discussed above, the managed node 1260 may include resources distributed across multiple sleds and in such embodiments, the communication circuitry 1308 may include portions thereof located on the same sled or different sled. In the illustrative embodiment, the NIC 1310 in every sled having physical storage resources 205-1 (e.g., data storage devices 1314) includes the power loss protected buffer 1312.

The one or more illustrative data storage devices 1314, may be embodied as any type of devices configured for short-term or long-term storage of data such as, for example, solid-state drives (SSDs), hard disk drives, memory cards, and/or other memory devices and circuits. Each data storage device 1314 may include a system partition that stores data and firmware code for the data storage device 1314. Each data storage device 1314 may also include an operating system partition that stores data files and executables for an operating system. In the illustrative embodiment, each data storage device 1314 includes non-volatile memory. Non-volatile memory may be embodied as any type of data storage capable of storing data in a persistent manner (even if power is interrupted to the non-volatile memory). For example, in the illustrative embodiment, the non-volatile memory is embodied as Flash memory (e.g., NAND memory). In other embodiments, the non-volatile memory may be embodied as any combination of memory devices that use chalcogenide phase change material (e.g., chalcogenide glass), or other types of byte-addressable, write-in-place non-volatile memory, ferroelectric transistor random-access memory (FeTRAM), nanowire-based non-volatile memory, phase change memory (PCM), memory that incorporates memristor technology, magnetoresistive random-access memory (MRAM) or Spin Transfer Torque (STT)-MRAM.

Additionally, the managed node 1260 may include one or more peripheral devices 1316. Such peripheral devices 1316 may include any type of peripheral device commonly found in a compute device such as a display, speakers, a mouse, a keyboard, and/or other input/output devices, interface devices, and/or other peripheral devices.

The client device 1220 and the orchestrator server 1240 may have components similar to those described in FIG. 13, with the exception that the power loss protected buffer 1312 may be absent in the client device 1220 and/or the orchestrator server 1240. The description of those components of the managed node 1260 is equally applicable to the description of components of the client device 1220 and the orchestrator server 1240 and is not repeated herein for clarity of the description. Further, it should be appreciated that any of the client device 1220 and the orchestrator server 1240 may include other components, sub-components, and devices commonly found in a computing device, which are not discussed above in reference to the managed node 1260 and not discussed herein for clarity of the description.

As described above, the client device 1220, the orchestrator server 1240 and the managed nodes 1260 are illustratively in communication via the network 1230, which may be embodied as any type of wired or wireless communication network, including global networks (e.g., the Internet), local area networks (LANs) or wide area networks (WANs), cellular networks (e.g., Global System for Mobile Communications (GSM), 3G, Long Term Evolution (LTE), Worldwide Interoperability for Microwave Access (Wi-MAX), etc.), digital subscriber line (DSL) networks, cable networks (e.g., coaxial networks, fiber networks, etc.), or any combination thereof.

Figure 14:
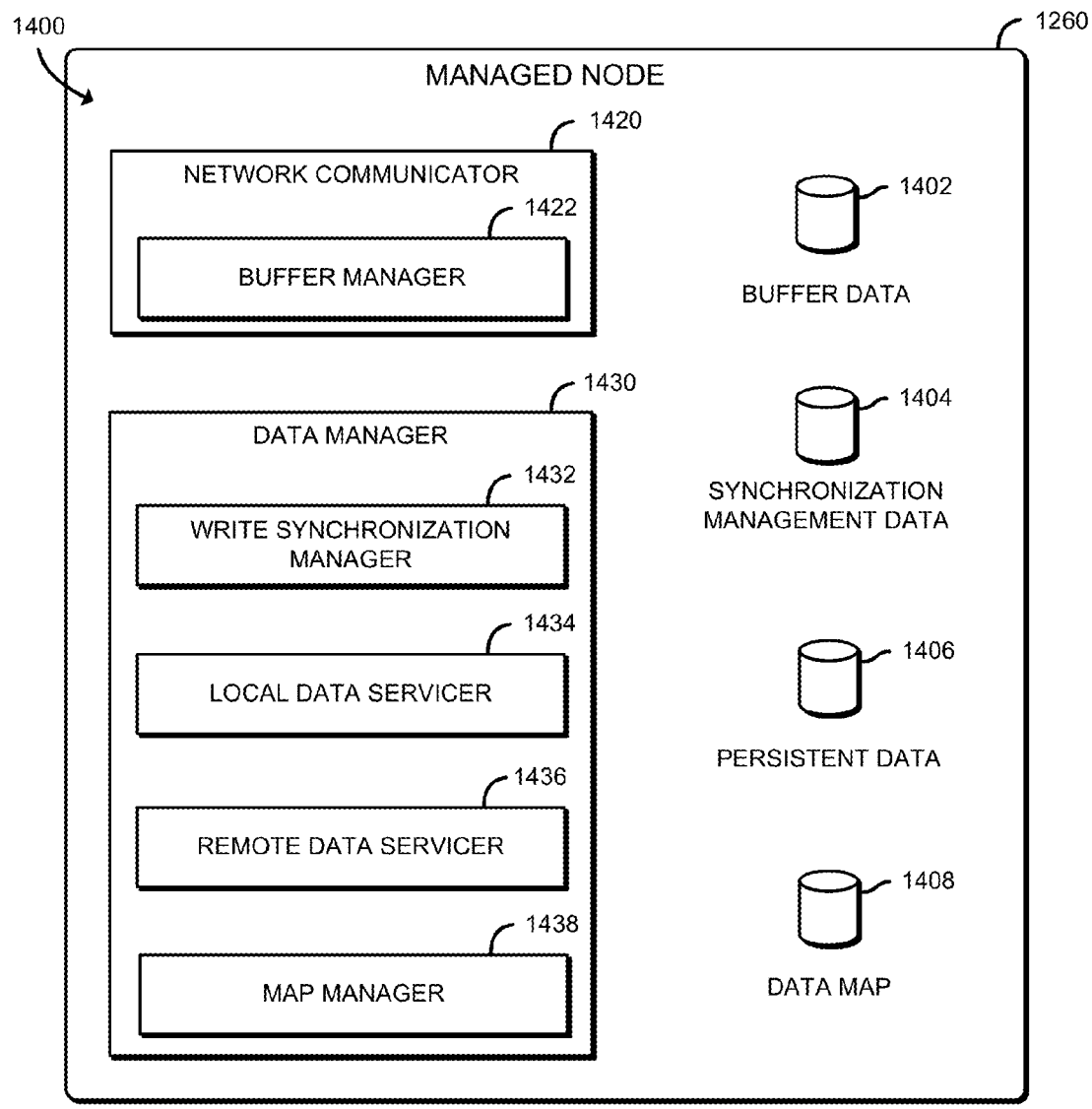
FIG. 14 is a simplified block diagram of at least one embodiment of an environment that may be established by a managed node of FIGS. 12 and 13.

Referring now to FIG. 14, in the illustrative embodiment, the managed node 1260 may establish an environment 1400 during operation. The illustrative environment 1400 includes a network communicator 1420 and a data manager 1430. Each of the components of the environment 1400 may be embodied as hardware, firmware, software, or a combination thereof. As such, in some embodiments, one or more of the components of the environment 1400 may be embodied as circuitry or a collection of electrical devices (e.g., network communicator circuitry 1420, data manager circuitry 1430, etc.). It should be appreciated that, in such embodiments, one or more of the network communicator circuitry 1420 or the data manager circuitry 1430 may form a portion of one or more of the CPU 1302, the main memory 1304, the I/O subsystem 1306, the communication circuitry 1308, and/or other components of the managed node 1260. In the illustrative embodiment, the environment 1400 includes buffer data 1402 which may be embodied as any data (e.g., data blocks) present in the power loss protected buffer 1312 of the NIC 1310 if the managed node 1260 has received a request to write a data block to non-volatile memory (e.g., a data storage device 1314). Additionally, the environment includes synchronization management data 1404 which may be embodied as any data indicative of the number partially synchronized write requests associated with a workload executed by the managed node 1260 at any given time and the status of each partially synchronized write request, such as how many acknowledgements are expected to be received and how many acknowledgements have been received. The synchronization management data 1404 may also include data indicative of measured time periods between received acknowledgements for each write request (e.g., an amount of time that has elapsed between an initial acknowledgement and a subsequent acknowledgement), the number of allowable partially synchronized write requests that may be outstanding at any given time, and/or other measurements and settings. The environment 1400, in the illustrative embodiment, also includes persistent data 1406 which may be embodied as any data that has been written to non-volatile memory (e.g., one or more data storage devices 1314) of the managed node 1260. Additionally, in the illustrative embodiment, the environment 1400 includes a data map 1408 which may be embodied as any data indicative of locations where data blocks have been stored in the data storage devices 1314 (i.e., non-volatile memory) of the managed node 1260 and/or in one or more other managed nodes 1260. In the illustrative embodiment, each data block is identified by a key (e.g., a unique identifier, such as an alphanumeric code), such that the key and the corresponding data block form a key-value pair.

In the illustrative environment 1400, the network communicator 1420, which may be embodied as hardware, firmware, software, virtualized hardware, emulated architecture, and/or a combination thereof as discussed above, is configured to facilitate inbound and outbound network communications (e.g., network traffic, network packets, network flows, etc.) to and from the managed node 1260, respectively and to assist in performing partially synchronized writes through the network 1230. To do so, the network communicator 1420 is configured to receive and process data packets from one system or computing device (e.g., the orchestrator server 1240, a managed node 1260, etc.) and to prepare and send data packets to another computing device or system (e.g., another managed node 1260). Accordingly, in some embodiments, at least a portion of the functionality of the network communicator 1420 may be performed by the communication circuitry 1308, and, in the illustrative embodiment, by the NIC 1310. In the illustrative embodiment, the network communicator 1420 includes a buffer manager 1422, which, in the illustrative embodiment, is configured to store a received data block from a write request in the power loss protected buffer 1312, send an early acknowledgement message through the network 1230 in response to the write request, indicating that the data block has been successfully stored, and coordinate subsequently writing the data block to the non-volatile memory (e.g., from the buffer data 1402 to the persistent data 1406).

The data manager 1430, which may be embodied as hardware, firmware, software, virtualized hardware, emulated architecture, and/or a combination thereof as discussed above, is configured to manage writing and reading of data to resources of the managed node 1260 (e.g., the data storage devices 1314) and/or to and from other managed nodes 1260, including managing partially synchronized writes. To do so, in the illustrative embodiment, the data manager 1430 includes a write synchronization manager 1432, a local data servicer 1434, a remote data servicer 1436, and a map manager 1438. The write synchronization manager 1432, in the illustrative embodiment, is configured to manage partially synchronized writes, such as by determining whether the managed node is to perform partially synchronized writes for a given workload, coordinating issuing write requests and pausing execution of the workload until an acknowledgement to the write request has been received, tracking the status of the other write requests, such as by tracking how many partially synchronized write requests are outstanding at any given time and how long the delay is between the first acknowledgement and a second acknowledgement for a given write request, and adjusting thresholds to change the number of concurrent partially synchronized writes that are allowed in the future, based on the delays between the acknowledgements.

The local data servicer 1434, in the illustrative embodiment, is configured to write data blocks and associated keys to the one or more data storage devices 1314 of the managed node 1260 and/or read data blocks from the one or more data storage devices 1314 of the managed node 1260. The remote data servicer 1436, in the illustrative embodiment, is configured to write data blocks and/or read data blocks to and from the data storage devices 1314 of one or more other managed nodes 1260 by issuing corresponding requests and receiving corresponding responses through the network 1230. As such, the local data servicer 1434 and the remote data servicer 1436, in the illustrative embodiment, are configured to interoperate with the write synchronization manager 1432 to coordinate performing partially synchronized writes.

The map manager 1438, in the illustrative embodiment, is configured to track where data blocks are stored among the data storage devices 1314 of the managed node 1260 and/or other managed nodes 1260. In doing so, the map manager 1438 may store keys in association with location identifiers, such as unique identifiers of data storage devices 1314 in which the data blocks are stored, and/or logical block addresses of the data blocks.

It should be appreciated that each of the write synchronization manager 1432, the local data servicer 1434, the remote data servicer 1436, and the map manager 1438 may be separately embodied as hardware, firmware, software, virtualized hardware, emulated architecture, and/or a combination thereof and may be distributed across multiple sleds. For example, the write synchronization manager 1432 may be embodied as a hardware component, while the local data servicer 1434, the remote data servicer 1436, and the map manager 1438 are embodied as virtualized hardware components or as some other combination of hardware, firmware, software, virtualized hardware, emulated architecture, and/or a combination thereof.

Figure 15:
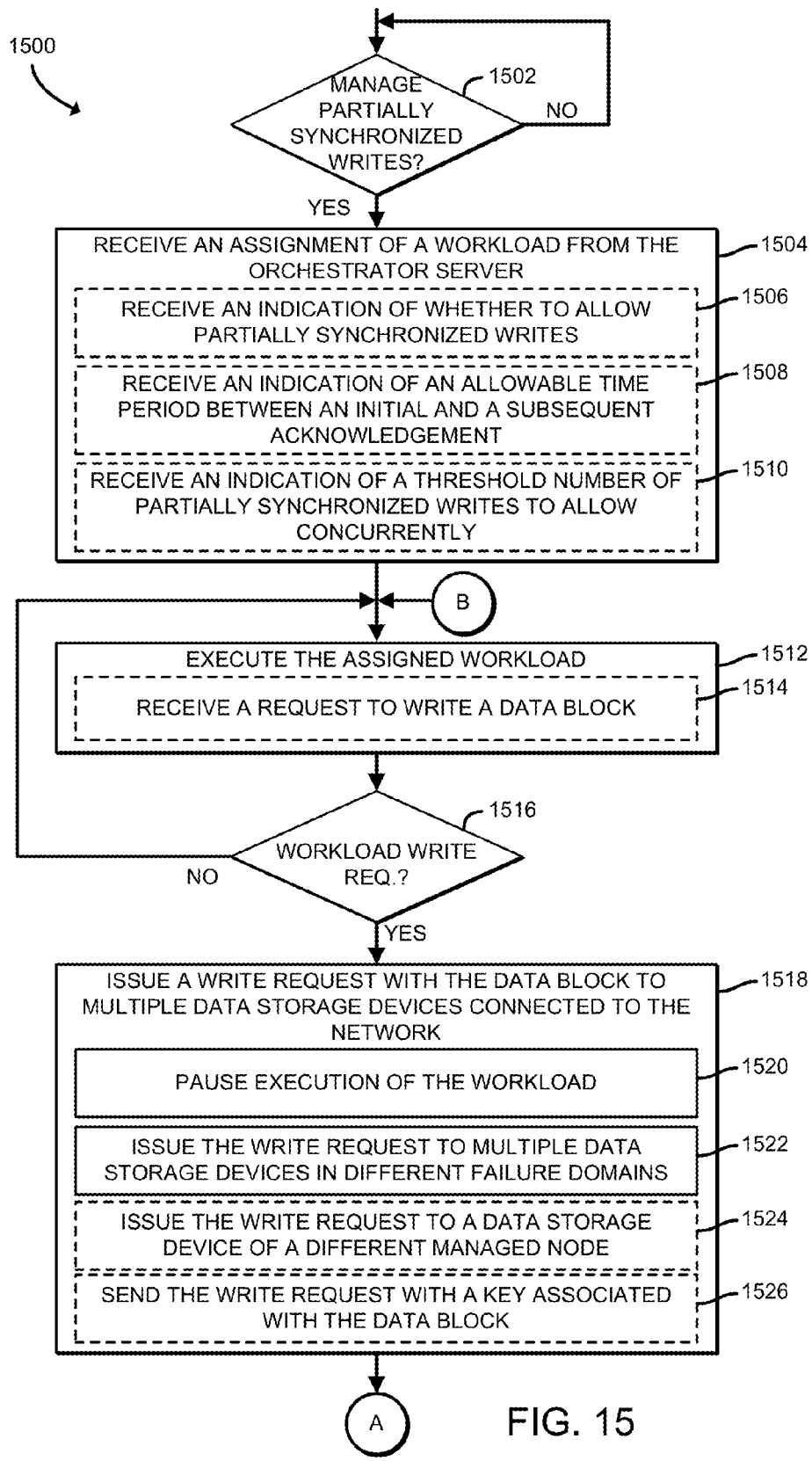
FIGS. 15-16 are a simplified flow diagram of at least one embodiment of a method for managing partially synchronized writes that may be performed by a managed node of FIGS. 12-14.

Referring now to FIG. 15, in use, the managed node 1260 may execute a method 1500 for managing partially synchronized writes to improve the quality of service of a workload. The method 1500 begins with block 1502, in which the managed node 1260 determines whether to manage partially synchronized writes. In the illustrative embodiment, the managed node 1260 determines to manage partially synchronized writes if the managed node 1260 is powered on and has access to (e.g., locally and/or through the network 1230) the one or more data storage devices 1314. In other embodiments, the managed node 1260 may determine whether to manage partially synchronized writes based on other factors. Regardless, in response to a determination to manage partially synchronized writes, in the illustrative embodiment, the method 1500 advances to block 1504 in which the managed node 1260 may receive an assignment of a workload from the orchestrator server 1240. In doing so, as indicated in block 1506, the managed node 1260 may receive an indication of whether to allow partially synchronized writes for the workload. For example, the decision of whether to enable the partially synchronized writes may be an option that a customer may select as part of an agreement with an operator of the data center. As such, the orchestrator server 1240 may provide, to the managed node 1260, an indication of the selection when the orchestrator server 1240 assigns the workload to the managed node 1260. As indicated in block 1508, the managed node 1260 may also receive an indication of an allowable time period that may elapse between an initial and a subsequent acknowledgement of a write request that was sent to different data storage devices 1314 connected to the network 1230. The indication of the allowable time period may be a number of microseconds, or any other measure of time. In receiving the assignment of the workload, the managed node 1260 may also receive an indication of a threshold number of partially synchronized writes to allow concurrently, as indicated in block 1510. For example, the managed node 1260 may receive an indication to allow up to five partially synchronized writes at any given time for the workload before requiring any subsequent writes requests to be acknowledged at least twice before resuming execution of the workload.

Subsequently, the method 1500 advances to block 1512 in which the managed node 1260 executes the assigned workload (e.g., using physical compute resources 205-4 of the sled 204-4, such as the CPU 1302). In executing the assigned workload, the managed node 1260 may receive a request from an application associated with the workload to write a data block to non-volatile memory, as indicated in block 1514. In block 1516, the managed node 1260 determines whether a write request has been received. If not, the method 1500 loops back to block 1512 in which the managed node 1260 continues executing the assigned workload. However, referring back to block 1516, if the managed node 1260 instead determines that a request to write a data block was received, the method advances to block 1518 in which the managed node 1260 issues a write request with the data block to multiple data storage devices 1314 connected to the network 1230 (e.g., to physical storage resources 205-1 on different sleds and/or racks). In doing so, the managed node 1260 pauses execution of the workload, as indicated in block 1520. Further, as indicated in block 1522, the managed node 1260, in the illustrative embodiment, issues the write request to data storage devices 1314 that are in different failure domains. For example, the managed node 1260 may send the write request to different data storage devices 1314 that are each connected to the network 1230 by a different network interface controller 1310, such that the disconnection of any one of the data storage devices 1314 from the network 1230 does not affect the availability of any of the other data storage devices 1314. As indicated in block 1524, in issuing the write request, the managed node 1260 may issue the write request to one or more data storage devices 1314 that are part of a different managed node 1260. Additionally, as indicated in block 1526, in sending the data block with the request, the managed node 1260 may send a key that uniquely identifies the data block, so that the combination of the key and the data block form a key-value pair. Subsequently, the method 1500 advances to block 1528 of FIG. 16 in which the managed node 1260 receives (e.g., through the network 1230 to the network interface controller 1310 of the sled on which compute resources 205-4 executing the workload are located) an initial acknowledgement for the write request indicating that the data block was successfully stored.

Figure 16:
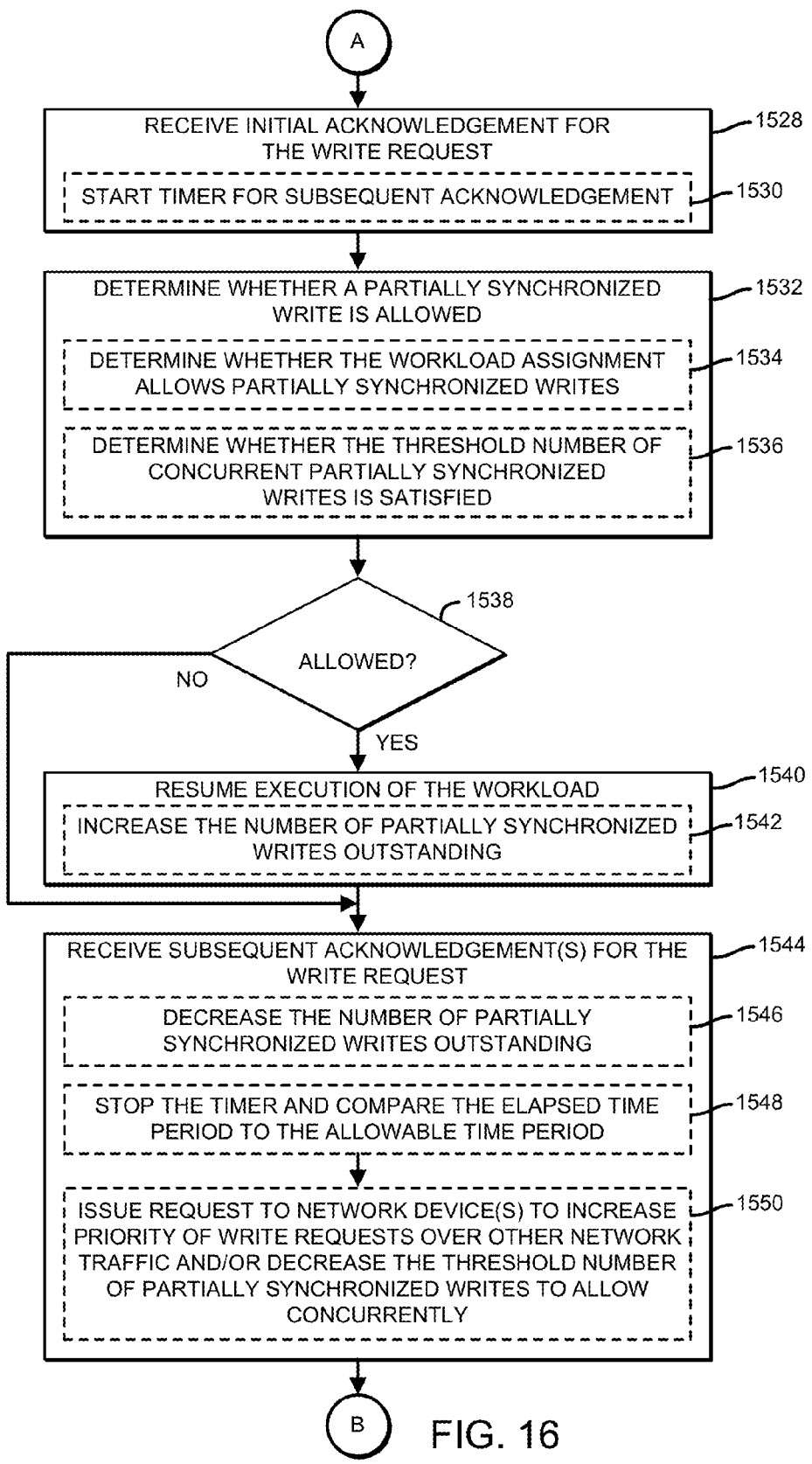

Referring now to FIG. 16, in receiving the initial acknowledgement for the write request, the managed node 1260 may start a timer to determine the amount of time that elapses until the managed node 1260 receives (e.g., through the network 1230 to the network interface controller 1310 of the sled on which compute resources 205-4 executing the workload are located) a subsequent acknowledgement to the write request. In block 1532, the managed node 1260 determines whether performing a partially synchronized write is allowed (e.g., whether the managed node 1260 should wait until a second acknowledgement is received before resuming execution of the workload). In doing so, the managed node 1260 may determine whether the assignment of the workload allows partially synchronized writes to be performed for the workload (e.g., based on the indicator received in block 1506), as indicated in block 1534. The managed node 1260 may also determine whether the threshold number of partially synchronized writes to allow (e.g., the threshold number received by the managed node 1260 in block 1510) is satisfied, as indicated in block 1536. Initially, if the threshold number is greater than zero, then the threshold will be satisfied, since no partially synchronized writes have been counted by the managed node 1260 yet.

In block 1538, the managed node 1260 takes further actions based on the determination in block 1532 of whether a partially synchronized write is allowed. If the managed node 1260 determines that a partially synchronized write is not allowed, the workload remains paused and the method 1500 advances to block 1544 in which the managed node 1260 receives one or more subsequent acknowledgements for the write request. Referring back to block 1538, if the managed node 1260 instead determines that a partially synchronized write is allowed, the method 1500 advances to block 1540, in which the managed node 1260 resumes execution of the workload. By resuming execution of the workload before receiving a subsequent acknowledgement, the write request becomes a partially synchronized write. As indicated in block 1542, the managed node 1260 may increase the number (e.g., a number in the write synchronization management data 1404) of partially synchronized writes that are presently outstanding for the workload. When execution of the workload is resumed, the workload may request additional writes and the managed node 1260 may, in response, perform the operations described above (e.g., in a separate thread). Afterwards, the method 1500 advances to block 1544 in which the managed node 1260 receives one or more subsequent acknowledgements for the write request.

As indicated in block 1546, in receiving the one or more subsequent acknowledgements, the managed node 1260 may decrease the number of partially synchronized writes that are presently outstanding (e.g., if the acknowledgements are in response to a partially synchronized write). The managed node 1260 may also stop the timer that was started in block 1530 and compare the elapsed time period to the allowable time period that was indicated with the assignment of the workload in block 1508, as indicated in block 1548. If the elapsed time period exceeds the allowable time period (e.g., the elapsed time period does not satisfy the allowable time period), the managed node 1260 may issue a request to one or more network devices (e.g., switches) to increase the priority of write requests over other network traffic, as indicated in block 1550. Additionally or alternatively, the managed node 1260 may decrease the threshold number of partially synchronized writes to allow concurrently (e.g., from five to four).

EXAMPLES

Illustrative examples of the technologies disclosed herein are provided below. An embodiment of the technologies may include any one or more, and any combination of, the examples described below.

Example 1 includes a managed node to manage partially synchronized writes, the managed node comprising a network communicator to issue a write request to write a data block, on behalf of a workload, to multiple data storage devices connected to a network; and a data manager to pause execution of the workload; wherein the network communicator is further to receive an initial acknowledgment associated with one of the multiple data storage devices, wherein the initial acknowledgement is indicative of successful storage of the data block; and the data manager is further to resume execution of the workload after receipt of the initial acknowledgement and before receipt of subsequent acknowledgements associated with any of the other data storage devices.

Example 2 includes the subject matter of Example 1, and wherein the network communicator is further to receive a subsequent acknowledgement associated with one of the other data storage devices after the workload has been resumed; and the data manager is further to determine an elapsed time period between the initial acknowledgement and the subsequent acknowledgement.

Example 3 includes the subject matter of any of Examples 1 and 2, and wherein the data manager is further to determine whether the elapsed time period satisfies a predefined threshold time period; and the network communicator is further to send, in response to a determination that the elapsed time period does not satisfy the predefined threshold time period, a request to at least one network device to increase a priority of write requests relative to other network traffic.

Example 4 includes the subject matter of any of Examples 1-3, and wherein the data manager is further to receive an assignment of the workload from an orchestrator server; and receive, with the assignment, an indication of the predefined threshold time period.

Example 5 includes the subject matter of any of Examples 1-4, and wherein the data manager is further to determine whether the elapsed time period satisfies a predefined threshold time period; and determine to await at least two acknowledgements in response to future write requests before resumption of the workload.

Example 6 includes the subject matter of any of Examples 1-5, and wherein the data manager is further to receive an assignment of the workload from an orchestrator server; receive, with the assignment, an indication of whether to enable partially synchronized writes; and wherein to resume execution of the workload comprises to determine whether the assignment indicates to enable partially synchronized writes; and resume execution in response to a determination that the assignment indicates to enable partially synchronized writes.

Example 7 includes the subject matter of any of Examples 1-6, and wherein to issue the write request to multiple data storage devices comprises to issue the write request to multiple data storage devices in different failure domains.

Example 8 includes the subject matter of any of Examples 1-7, and wherein to issue the write request to write a data block comprises to send a key associated with the data block, wherein the key uniquely identifies the data block.

Example 9 includes the subject matter of any of Examples 1-8, and wherein to issue the write request to multiple storage devices comprises to issue the write request to one or more data storage devices of a different managed node.

Example 10 includes the subject matter of any of Examples 1-9, and wherein to resume execution of the workload comprises to determine a number of partially synchronized write requests that have been issued, wherein each partially synchronized write request is a write request for which only one acknowledgement has been received; determine whether the number of partially synchronized write requests satisfies a threshold number of allowable partially synchronized write requests; and resume, in response to a determination that the number of partially synchronized write requests satisfies the threshold number, execution of the workload.

Example 11 includes the subject matter of any of Examples 1-10, and wherein the data manager is further to receive an indication of the threshold number from an orchestrator server.

Example 12 includes the subject matter of any of Examples 1-11, and wherein the network communicator is further to receive a subsequent acknowledgement associated with one of the other data storage devices after the workload has been resumed; and the data manager is further to determine an elapsed time period between the initial acknowledgement and the subsequent acknowledgement, determine whether the elapsed time period satisfies a predefined threshold time period, and reduce, in response to a determination that the elapsed time period does not satisfy the predefined threshold time period, the threshold number of allowable partially synchronized write requests.

Example 13 includes the subject matter of any of Examples 1-12, and wherein the network communicator is further to send, in response to a determination that the elapsed time period does not satisfy the predefined threshold time period, a request to at least one network device to increase a priority of write requests relative to other network traffic.

Example 14 includes a method for managing partially synchronized writes, the method comprising issuing, by a managed node, a write request to write a data block, on behalf of a workload, to multiple data storage devices connected to a network; pausing, by the managed node, execution of the workload; receiving, by the managed node, an initial acknowledgment associated with one of the multiple data storage devices, wherein the initial acknowledgement is indicative of successful storage of the data block; and resuming, by the managed node, execution of the workload after receipt of the initial acknowledgement and before receipt of subsequent acknowledgements associated with any of the other data storage devices.

Example 15 includes the subject matter of Example 14, and further including receiving, by the managed node, a subsequent acknowledgement associated with one of the other data storage devices after the workload has been resumed; and determining, by the managed node, an elapsed time period between the initial acknowledgement and the subsequent acknowledgement.

Example 16 includes the subject matter of any of Examples 14 and 15, and further including determining, by the managed node, whether the elapsed time period satisfies a predefined threshold time period; and sending, by the managed node and in response to a determination that the elapsed time period does not satisfy the predefined threshold time period, a request to at least one network device to increase a priority of write requests relative to other network traffic.

Example 17 includes the subject matter of any of Examples 14-16, and further including receiving, by the managed node, an assignment of the workload from an orchestrator server; and receiving, by the managed node, with the assignment, an indication of the predefined threshold time period.

Example 18 includes the subject matter of any of Examples 14-17, and further including determining, by the managed node, whether the elapsed time period satisfies a predefined threshold time period; and determining, by the managed node, to await at least two acknowledgements in response to future write requests before resumption of the workload.

Example 19 includes the subject matter of any of Examples 14-18, and further including receiving, by the managed node, an assignment of the workload from an orchestrator server; receiving, by the managed node, with the assignment, an indication of whether to enable partially synchronized writes; and wherein resuming execution of the workload comprises determining whether the assignment indicates to enable partially synchronized writes; and resuming execution in response to a determination that the assignment indicates to enable partially synchronized writes.

Example 20 includes the subject matter of any of Examples 14-19, and wherein issuing the write request to multiple data storage devices comprises issuing the write request to multiple data storage devices in different failure domains.

Example 21 includes the subject matter of any of Examples 14-20, and wherein issuing the write request to write a data block comprises sending a key associated with the data block, wherein the key uniquely identifies the data block.

Example 22 includes the subject matter of any of Examples 14-21, and wherein issuing the write request to multiple storage devices comprises issuing the write request to one or more data storage devices of a different managed node.

Example 23 includes the subject matter of any of Examples 14-22, and wherein resuming execution of the workload comprises determining, by the managed node, a number of partially synchronized write requests that have been issued, wherein each partially synchronized write request is a write request for which only one acknowledgement has been received; determining, by the managed node, whether the number of partially synchronized write requests satisfies a threshold number of allowable partially synchronized write requests; and resuming, by the managed node and in response to a determination that the number of partially synchronized write requests satisfies the threshold number, execution of the workload.

Example 24 includes the subject matter of any of Examples 14-23, and further including receiving, by the managed node, an indication of the threshold number from an orchestrator server.

Example 25 includes the subject matter of any of Examples 14-24, and further including receiving, by the managed node, a subsequent acknowledgement associated with one of the other data storage devices after the workload has been resumed; determining, by the managed node, an elapsed time period between the initial acknowledgement and the subsequent acknowledgement; determining, by the managed node, whether the elapsed time period satisfies a predefined threshold time period; and reducing, by the managed node and in response to a determination that the elapsed time period does not satisfy the predefined threshold time period, the threshold number of allowable partially synchronized write requests.

Example 26 includes the subject matter of any of Examples 14-25, and further including sending, by the managed node and in response to a determination that the elapsed time period does not satisfy the predefined threshold time period, a request to at least one network device to increase a priority of write requests relative to other network traffic.

Example 27 includes one or more computer-readable storage media comprising a plurality of instructions that, when executed by a managed node, cause the managed node to perform the method of any of Examples 14-26.

Example 28 includes a managed node comprising means for issuing a write request to write a data block, on behalf of a workload, to multiple data storage devices connected to a network; means for pausing execution of the workload; means for receiving an initial acknowledgment associated with one of the multiple data storage devices, wherein the initial acknowledgement is indicative of successful storage of the data block; and means for resuming execution of the workload after receipt of the initial acknowledgement and before receipt of subsequent acknowledgements associated with any of the other data storage devices.

Example 29 includes the subject matter of Example 28, and further including means for receiving a subsequent acknowledgement associated with one of the other data storage devices after the workload has been resumed; and means for determining an elapsed time period between the initial acknowledgement and the subsequent acknowledgement.

Example 30 includes the subject matter of any of Examples 28 and 29, and further including means for determining whether the elapsed time period satisfies a predefined threshold time period; and means for sending, in response to a determination that the elapsed time period does not satisfy the predefined threshold time period, a request to at least one network device to increase a priority of write requests relative to other network traffic.

Example 31 includes the subject matter of any of Examples 28-30, and further including means for receiving an assignment of the workload from an orchestrator server; and means for receiving with the assignment, an indication of the predefined threshold time period.

Example 32 includes the subject matter of any of Examples 28-31, and further including means for determining whether the elapsed time period satisfies a predefined threshold time period; and means for determining to await at least two acknowledgements in response to future write requests before resumption of the workload.

Example 33 includes the subject matter of any of Examples 28-32, and further including means for receiving an assignment of the workload from an orchestrator server; means for receiving with the assignment, an indication of whether to enable partially synchronized writes; and wherein the means for resuming execution of the workload comprises means for determining whether the assignment indicates to enable partially synchronized writes; and means for resuming execution in response to a determination that the assignment indicates to enable partially synchronized writes.

Example 34 includes the subject matter of any of Examples 28-33, and wherein the means for issuing the write request to multiple data storage devices comprises means for issuing the write request to multiple data storage devices in different failure domains.

Example 35 includes the subject matter of any of Examples 28-34, and wherein the means for issuing the write request to write a data block comprises means for sending a key associated with the data block, wherein the key uniquely identifies the data block.

Example 36 includes the subject matter of any of Examples 28-35, and wherein the means for issuing the write request to multiple storage devices comprises means for issuing the write request to one or more data storage devices of a different managed node.

Example 37 includes the subject matter of any of Examples 28-36, and wherein the means for resuming execution of the workload comprises means for determining a number of partially synchronized write requests that have been issued, wherein each partially synchronized write request is a write request for which only one acknowledgement has been received; means for determining whether the number of partially synchronized write requests satisfies a threshold number of allowable partially synchronized write requests; and means for resuming, in response to a determination that the number of partially synchronized write requests satisfies the threshold number, execution of the workload.

Example 38 includes the subject matter of any of Examples 28-37, and further including means for receiving an indication of the threshold number from an orchestrator server.

Example 39 includes the subject matter of any of Examples 28-38, and further including means for receiving a subsequent acknowledgement associated with one of the other data storage devices after the workload has been resumed; means for determining an elapsed time period between the initial acknowledgement and the subsequent acknowledgement; means for determining whether the elapsed time period satisfies a predefined threshold time period; and means for reducing, in response to a determination that the elapsed time period does not satisfy the predefined threshold time period, the threshold number of allowable partially synchronized write requests.

Example 40 includes the subject matter of any of Examples 28-39, and further including means for sending, in response to a determination that the elapsed time period does not satisfy the predefined threshold time period, a request to at least one network device to increase a priority of write requests relative to other network traffic.

The invention claimed is:

1. A managed node to manage partially synchronized writes, the managed node comprising:
a network communicator to issue a write request to write a data block, on behalf of a workload, to multiple data storage devices connected to a network; and
a data manager to pause execution of the workload;
wherein the network communicator is further to receive an initial acknowledgment associated with one of the multiple data storage devices, wherein the initial acknowledgement is indicative of successful storage of the data block;
the data manager is further to resume execution of the workload after receipt of the initial acknowledgement and before receipt of subsequent acknowledgements associated with any other data storage devices of the multiple data storage devices;

the network communicator is further to receive a subsequent acknowledgement associated with one of the other data storage devices after the workload has been resumed; and
the data manager is further to determine an elapsed time period between the initial acknowledgement and the subsequent acknowledgement.

2. The managed node of claim 1, wherein:
the data manager is further to determine whether the elapsed time period satisfies a predefined threshold time period; and
the network communicator is further to send, in response to a determination that the elapsed time period does not satisfy the predefined threshold time period, a request to at least one network device to increase a priority of write requests relative to other network traffic.

3. The managed node of claim 2, wherein the data manager is further to:
receive an assignment of the workload from an orchestrator server; and
receive, with the assignment, an indication of the predefined threshold time period.

4. The managed node of claim 1, wherein the data manager is further to:
determine whether the elapsed time period satisfies a predefined threshold time period; and
determine to await at least two acknowledgements in response to future write requests before resumption of the workload.

5. The managed node of claim 1, wherein the data manager is further to:
receive an assignment of the workload from an orchestrator server;
receive, with the assignment, an indication of whether to enable partially synchronized writes; and
wherein to resume execution of the workload comprises to:
determine whether the assignment indicates to enable partially synchronized writes; and
resume execution in response to a determination that the assignment indicates to enable partially synchronized writes.

6. The managed node of claim 1, wherein to issue the write request to multiple data storage devices comprises to issue the write request to multiple data storage devices in different failure domains.

7. The managed node of claim 1, wherein to issue the write request to write a data block comprises to send a key associated with the data block, wherein the key uniquely identifies the data block.

8. The managed node of claim 1, wherein to issue the write request to multiple storage devices comprises to issue the write request to one or more data storage devices of a different managed node.

9. The managed node of claim 1, wherein to resume execution of the workload comprises to:
determine a number of partially synchronized write requests that have been issued, wherein each partially synchronized write request is a write request for which only one acknowledgement has been received;
determine whether the number of partially synchronized write requests satisfies a threshold number of allowable partially synchronized write requests; and
resume, in response to a determination that the number of partially synchronized write requests satisfies the threshold number, execution of the workload.

10. The managed node of claim 9, wherein the data manager is further to receive an indication of the threshold number from an orchestrator server.

11. One or more non-transitory computer-readable storage media comprising a plurality of instructions that, when executed by a managed node, cause the managed node to:
issue a write request to write a data block, on behalf of a workload, to multiple data storage devices connected to a network;
pause execution of the workload;
receive an initial acknowledgment associated with one of the multiple data storage devices, wherein the initial acknowledgement is indicative of successful storage of the data block;
resume execution of the workload after receipt of the initial acknowledgement and before receipt of subsequent acknowledgements associated with any other data storage devices of the multiple data storage devices;
receive a subsequent acknowledgement associated with one of the other data storage devices after the workload has been resumed; and
determine an elapsed time period between the initial acknowledgement and the subsequent acknowledgement.

12. The one or more non-transitory computer-readable storage media of claim 11, wherein the plurality of instructions, when executed, cause the managed node to:
determine whether the elapsed time period satisfies a predefined threshold time period; and
send, in response to a determination that the elapsed time period does not satisfy the predefined threshold time period, a request to at least one network device to increase a priority of write requests relative to other network traffic.

13. The one or more non-transitory computer-readable storage media of claim 12, wherein the plurality of instructions, when executed, cause the managed node to:
receive an assignment of the workload from an orchestrator server; and
receive with the assignment, an indication of the predefined threshold time period.

14. The one or more non-transitory computer-readable storage media of claim 11, wherein the plurality of instructions, when executed, cause the managed node to:
determine whether the elapsed time period satisfies a predefined threshold time period; and
determine to await at least two acknowledgements in response to future write requests before resumption of the workload.

15. The one or more non-transitory computer-readable storage media of claim 11, wherein the plurality of instructions, when executed, cause the managed node to:
receive an assignment of the workload from an orchestrator server;
receive with the assignment, an indication of whether to enable partially synchronized writes; and
wherein to resume execution of the workload comprises to:
determine whether the assignment indicates to enable partially synchronized writes; and
resume execution in response to a determination that the assignment indicates to enable partially synchronized writes.

16. The one or more non-transitory computer-readable storage media of claim 11, wherein to issue the write request to multiple data storage devices comprises to issue the write request to multiple data storage devices in different failure domains.

17. The one or more non-transitory computer-readable storage media of claim 11, wherein to issue the write request to write a data block comprises to send a key associated with the data block, wherein the key uniquely identifies the data block.

18. The one or more non-transitory computer-readable storage media of claim 11, wherein to issue the write request to multiple storage devices comprises to issue the write request to one or more data storage devices of a different managed node.

19. The one or more non-transitory computer-readable storage media of claim 11, wherein to resume execution of the workload comprises to:
  determine a number of partially synchronized write requests that have been issued, wherein each partially synchronized write request is a write request for which only one acknowledgement has been received;
  determine whether the number of partially synchronized write requests satisfies a threshold number of allowable partially synchronized write requests; and
  resume, in response to a determination that the number of partially synchronized write requests satisfies the threshold number, execution of the workload.

20. A method for managing partially synchronized writes, the method comprising:
  issuing, by a managed node, a write request to write a data block, on behalf of a workload, to multiple data storage devices connected to a network;
  pausing, by the managed node, execution of the workload;
  receiving, by the managed node, an initial acknowledgment associated with one of the multiple data storage devices, wherein the initial acknowledgement is indicative of successful storage of the data block;
  resuming, by the managed node, execution of the workload after receipt of the initial acknowledgement and before receipt of subsequent acknowledgements associated with any other data storage devices of the multiple data storage devices;
  receiving, by the managed node, a subsequent acknowledgement associated with one of the other data storage devices after the workload has been resumed; and
  determining, by the managed node, an elapsed time period between the initial acknowledgement and the subsequent acknowledgement.

21. The method of claim 20, further comprising:
  determining, by the managed node, whether the elapsed time period satisfies a predefined threshold time period; and
  sending, by the managed node and in response to a determination that the elapsed time period does not satisfy the predefined threshold time period, a request to at least one network device to increase a priority of write requests relative to other network traffic.

22. The method of claim 21, further comprising:
  receiving, by the managed node, an assignment of the workload from an orchestrator server; and
  receiving, by the managed node, with the assignment, an indication of the predefined threshold time period.

* * * * *